A. J. COON.
MACHINE FOR AUTOMATICALLY WRAPPING, BINDING, AND TYING PACKAGES.
APPLICATION FILED FEB. 9, 1912.

1,132,164.

Patented Mar. 16, 1915.
15 SHEETS—SHEET 3.

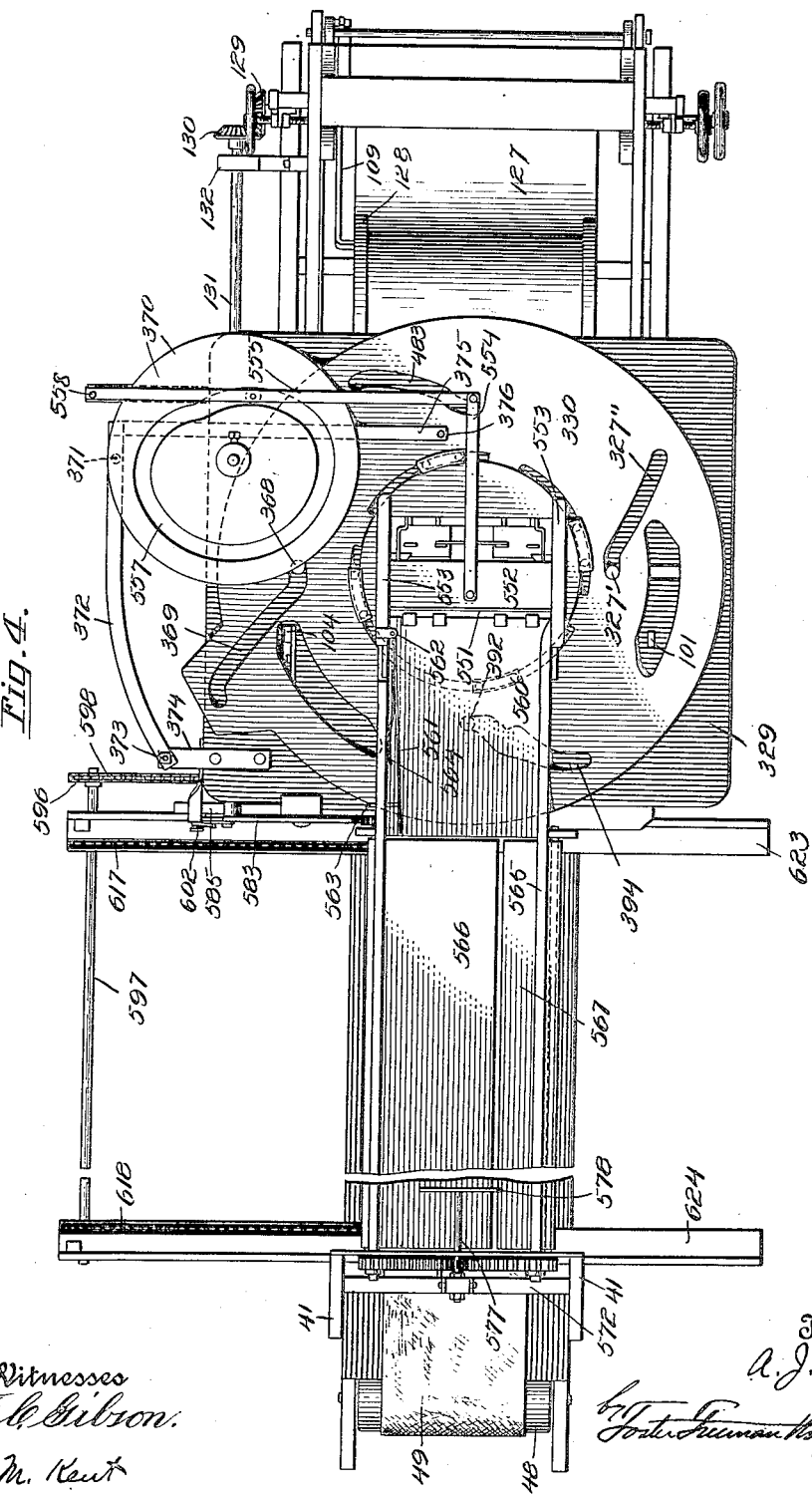

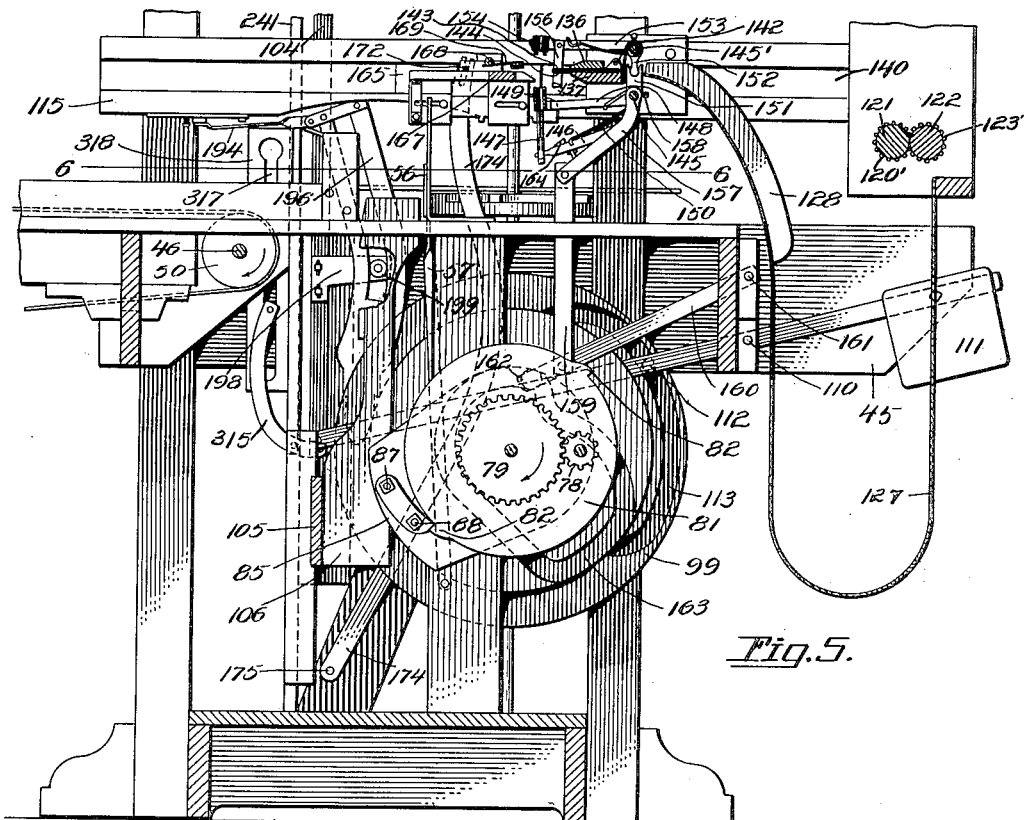

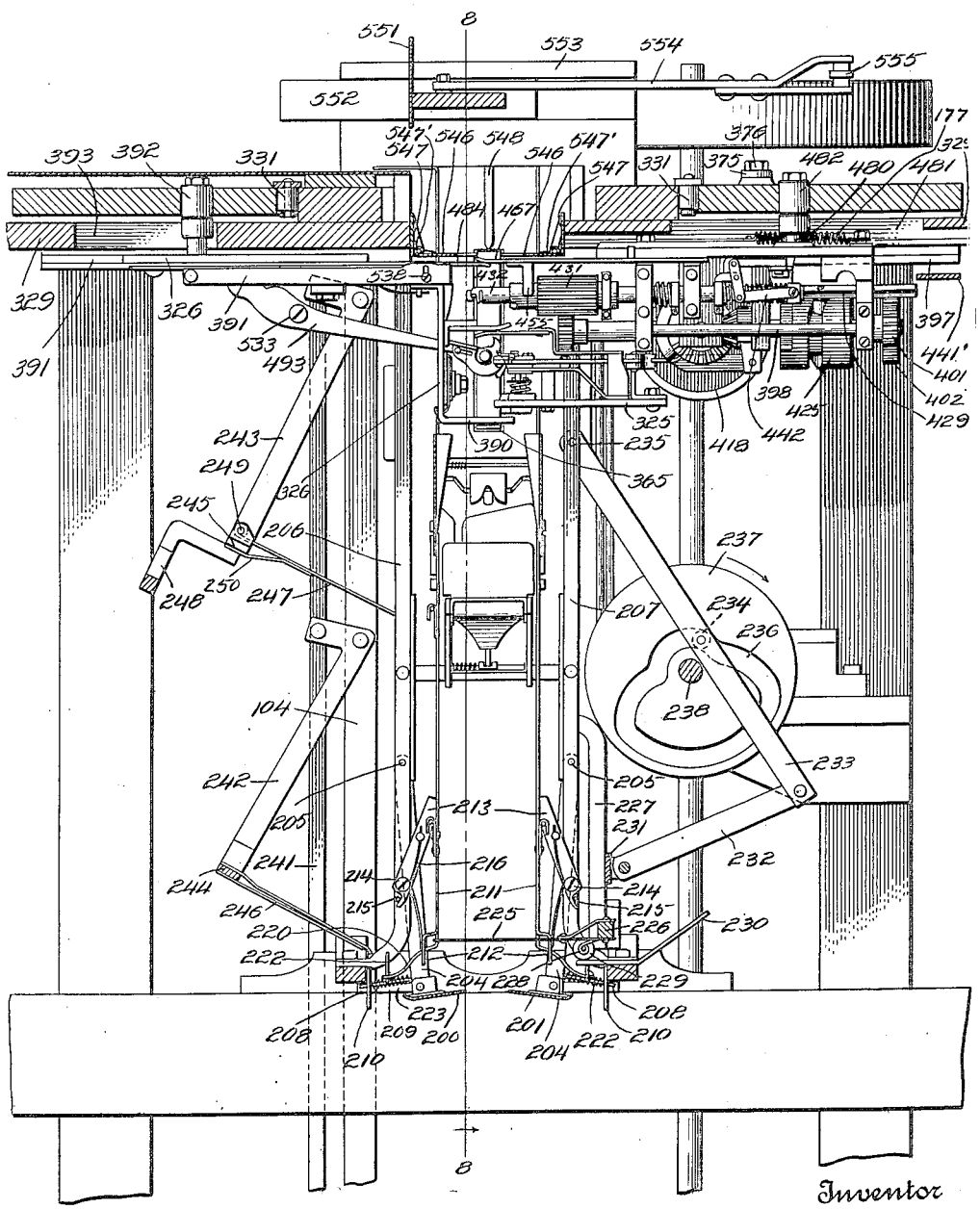

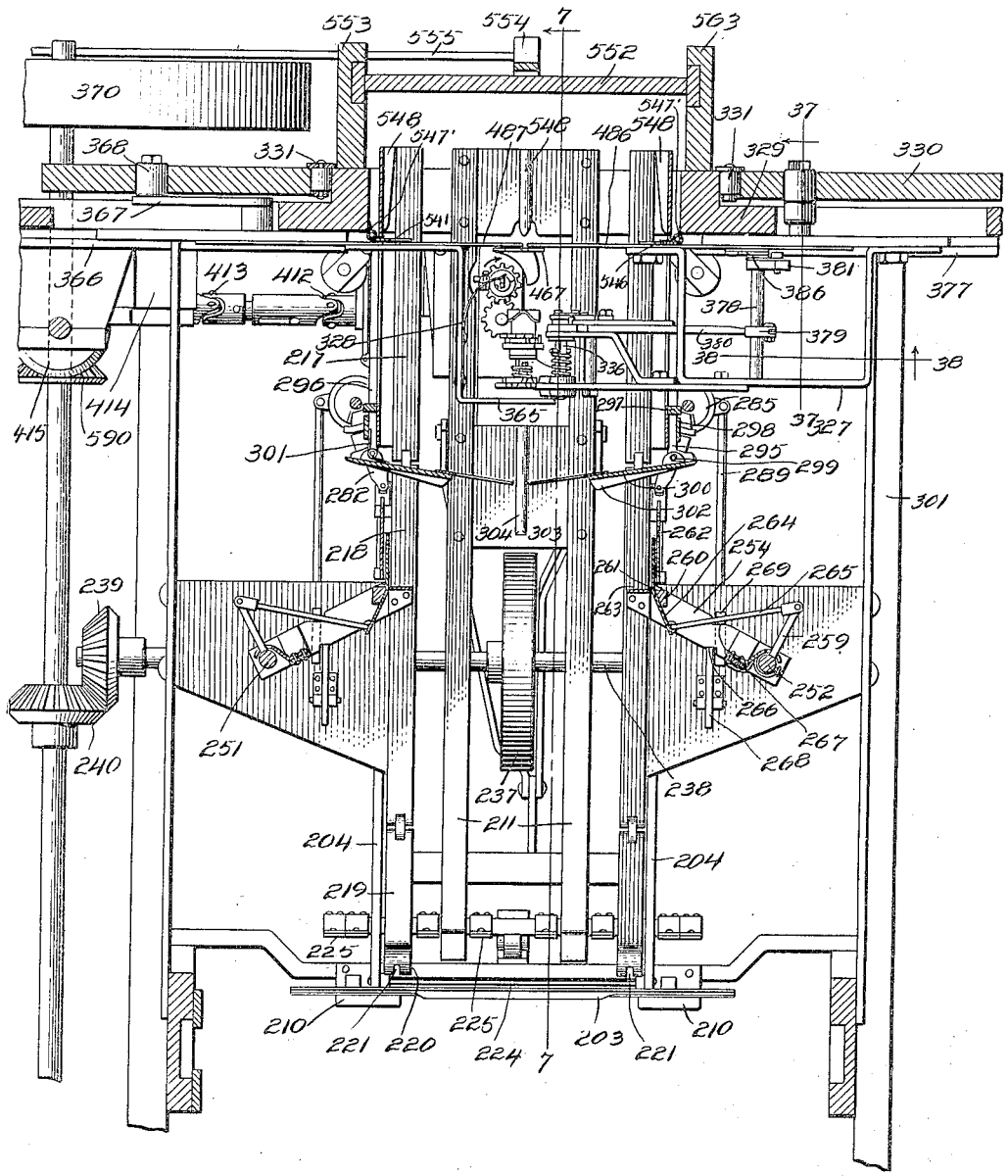

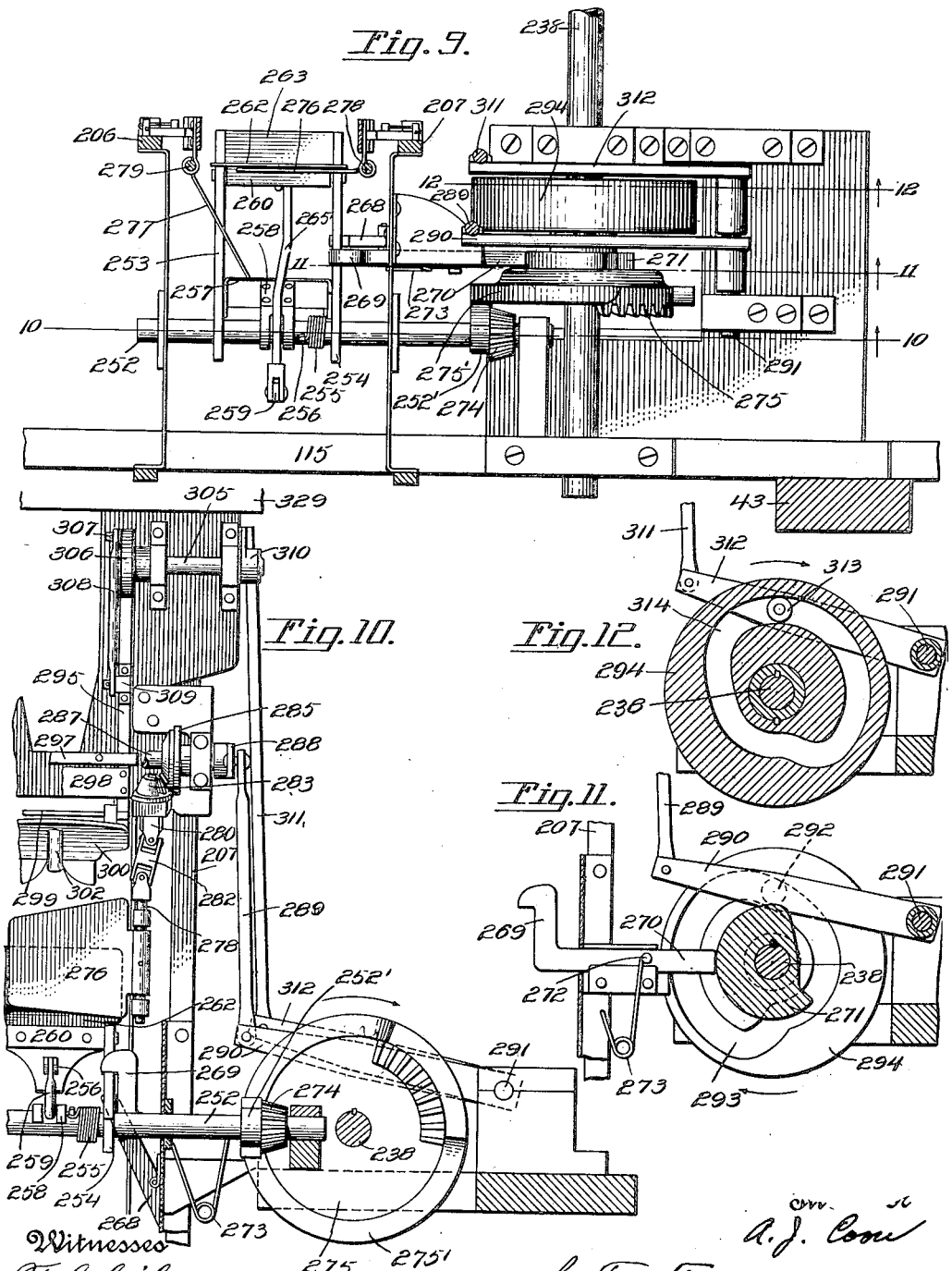

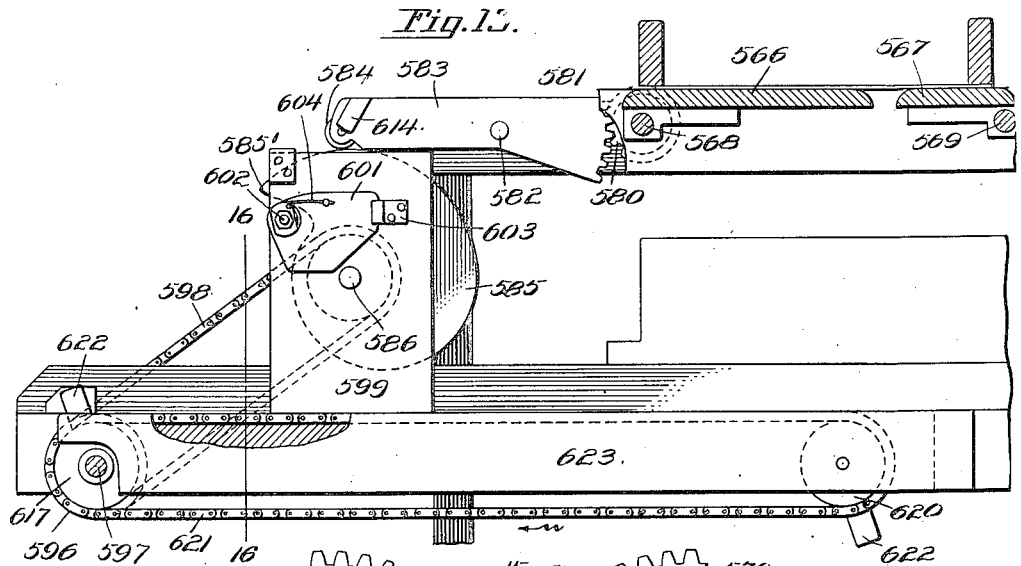
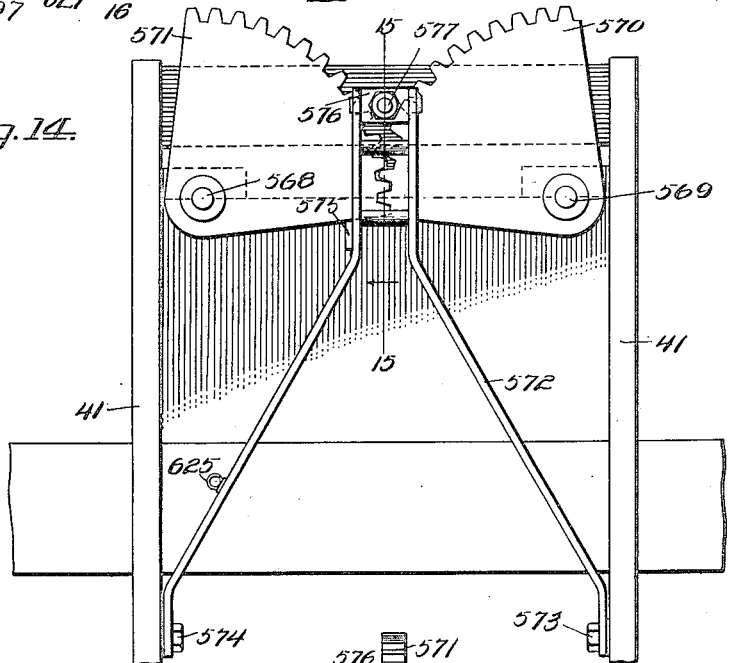
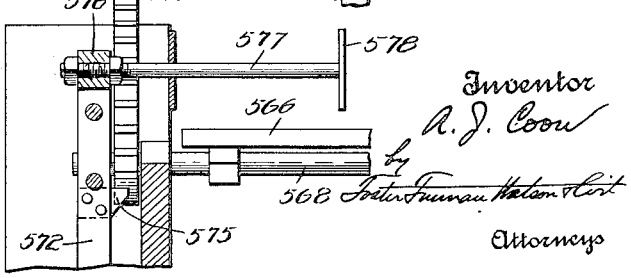

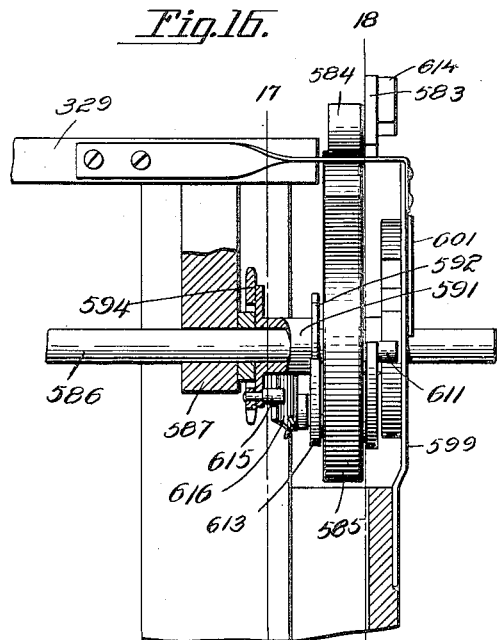
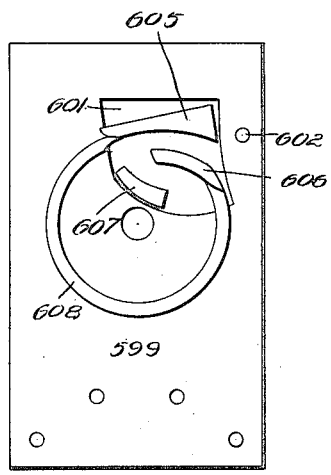
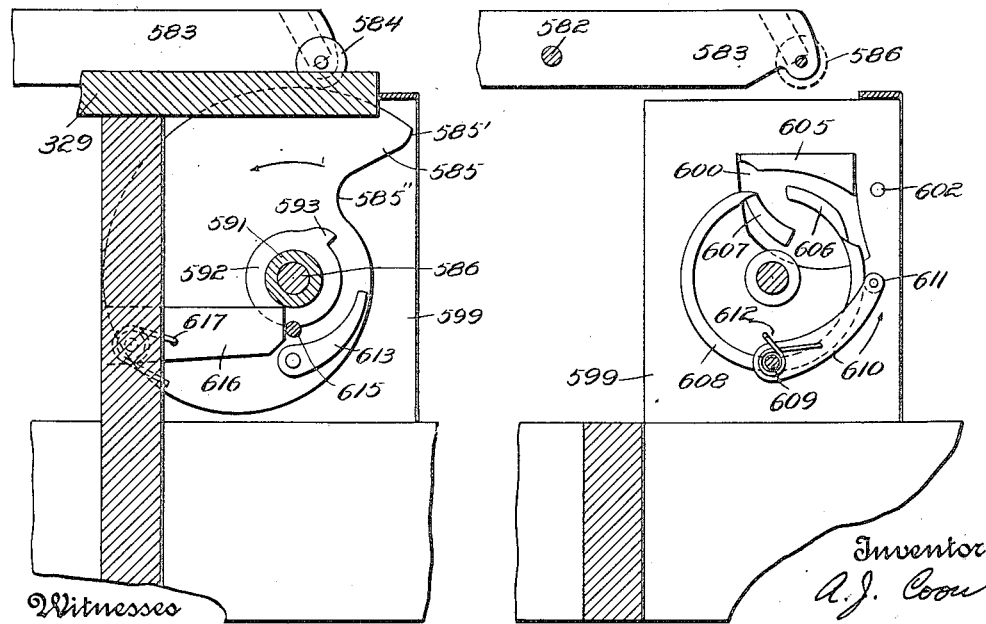

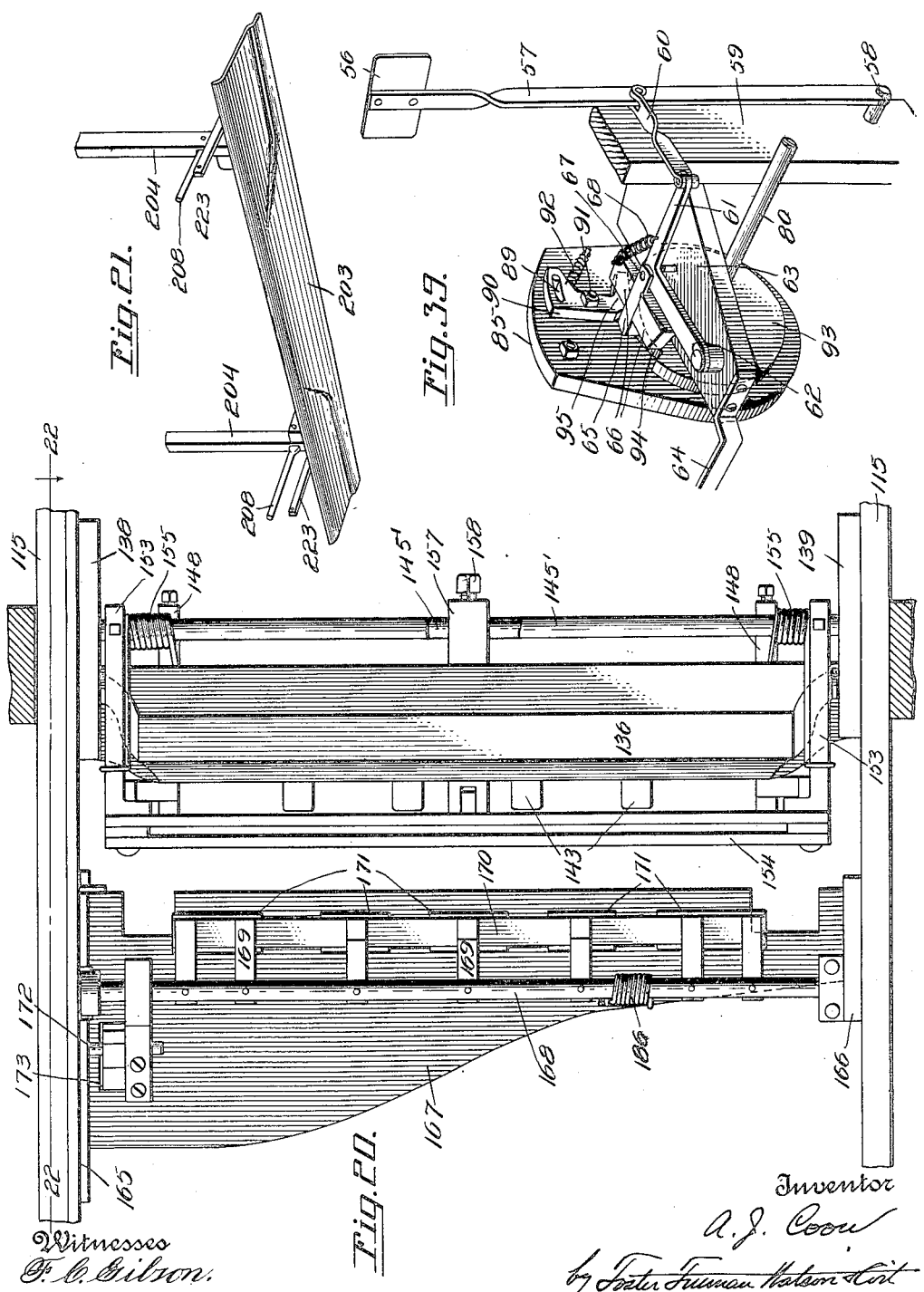

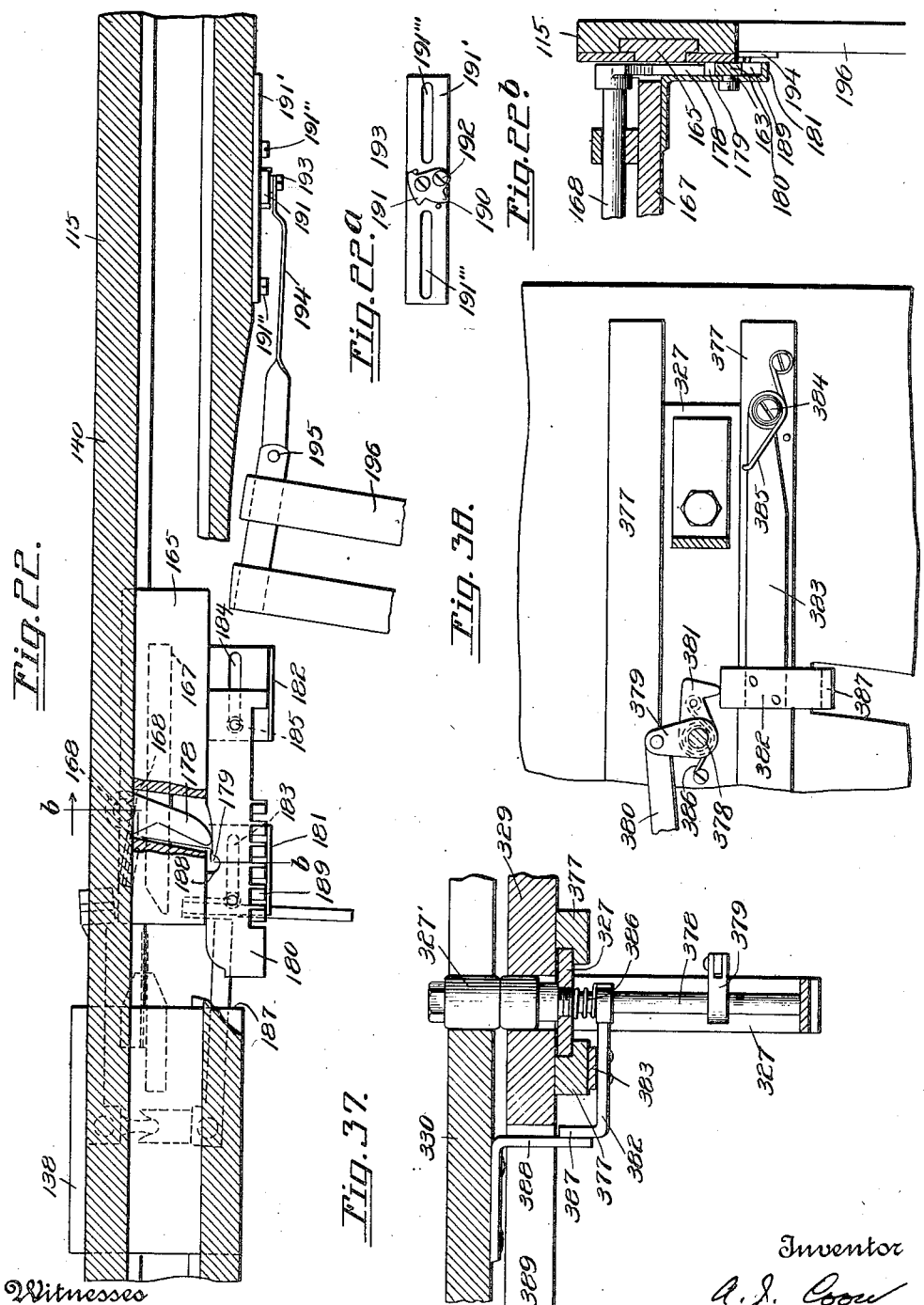

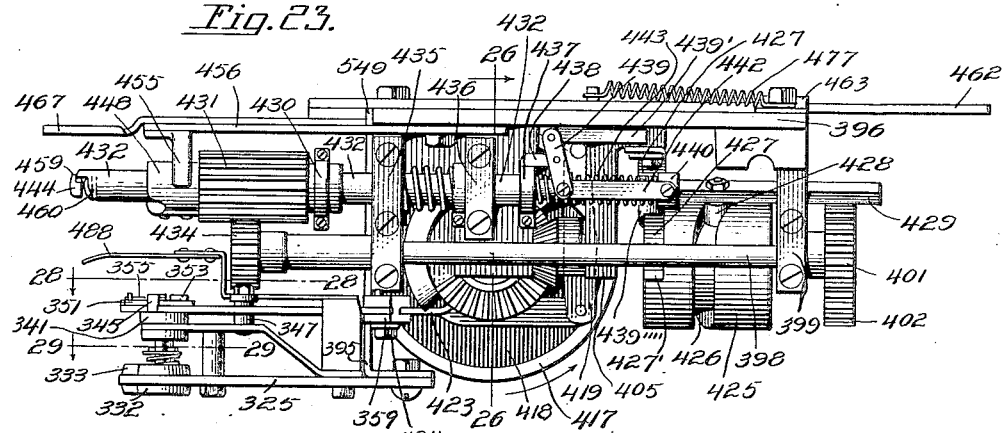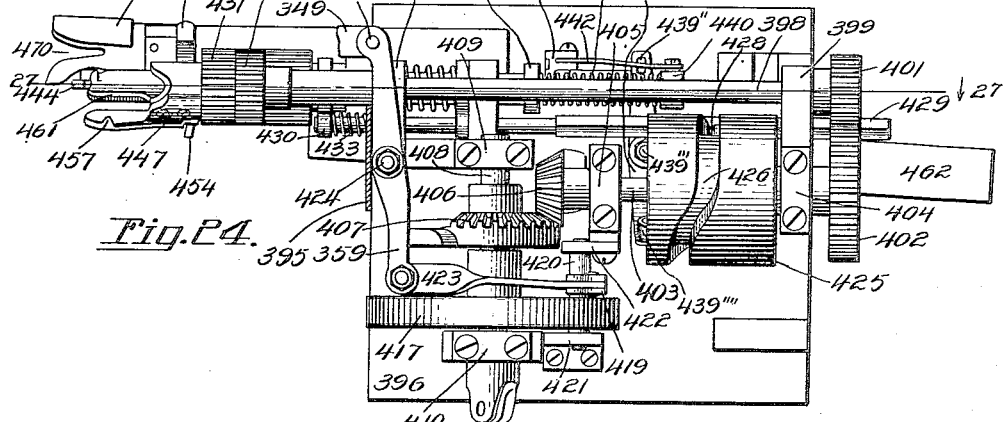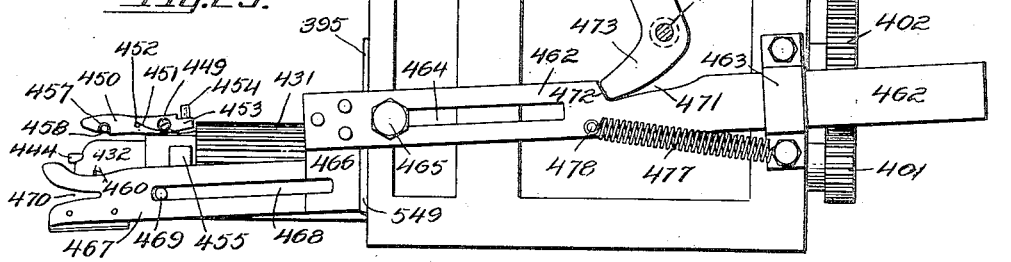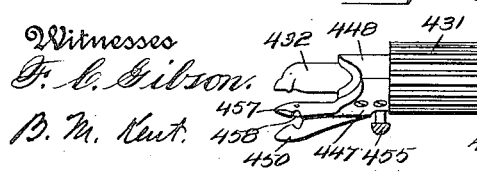

A. J. COON.
MACHINE FOR AUTOMATICALLY WRAPPING, BINDING, AND TYING PACKAGES.
APPLICATION FILED FEB. 9, 1912.

1,132,164.

Patented Mar. 16, 1915.
15 SHEETS—SHEET 14.

Witnesses
F. C. Gibson.
B. M. Kent.

Inventor
A. J. Coon
by Foster Freeman Watson &c
Attorneys

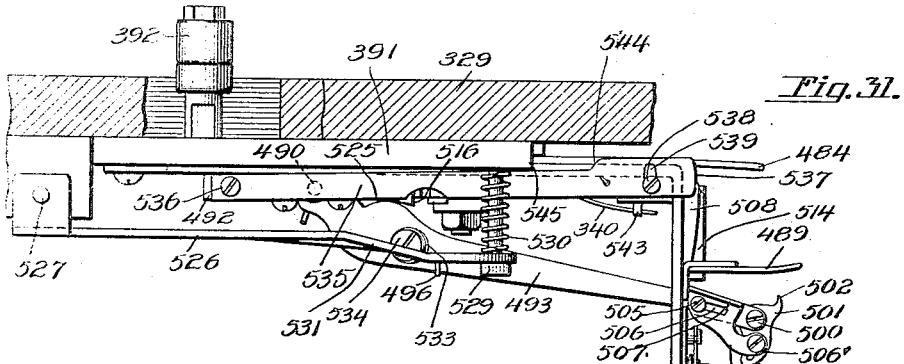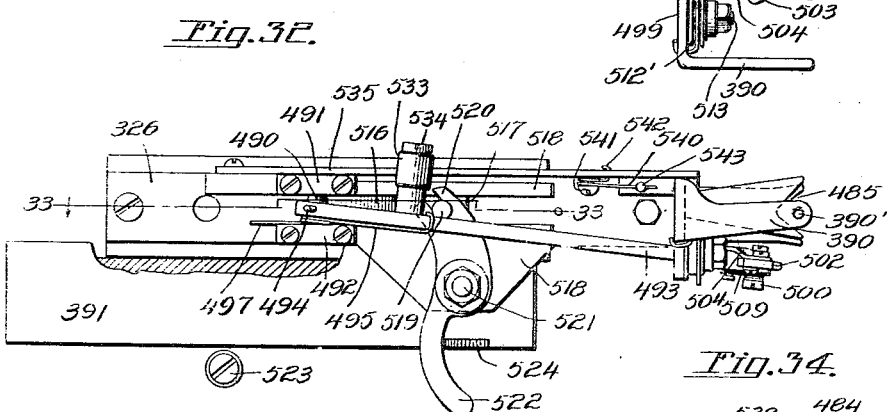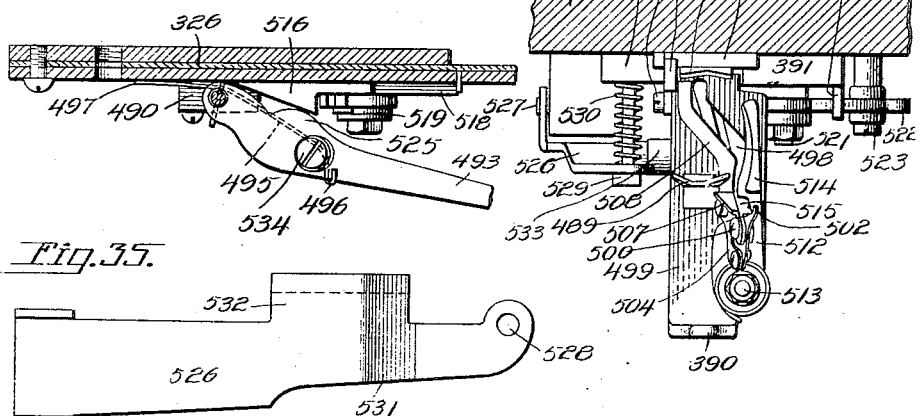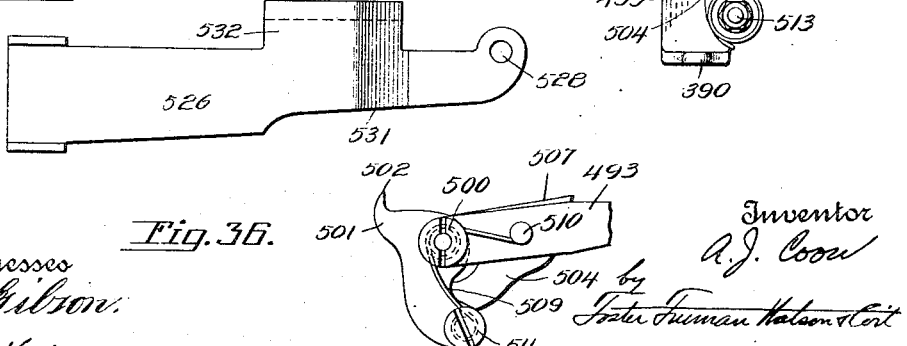

UNITED STATES PATENT OFFICE.

ARTHUR J. COON, OF WASHINGTON, DISTRICT OF COLUMBIA, ASSIGNOR OF ONE-HALF TO FRANCIS M. WILLIS, OF ITHACA, NEW YORK.

MACHINE FOR AUTOMATICALLY WRAPPING, BINDING, AND TYING PACKAGES.

1,132,164.     Specification of Letters Patent.     Patented Mar. 16, 1915.

Application filed February 9, 1912. Serial No. 676,551.

*To all whom it may concern:*

Be it known that I, ARTHUR J. COON, a citizen of the United States, residing at Washington, District of Columbia, have invented certain new and useful Improvements in Machines for Automatically Wrapping, Binding, and Tying Packages, of which the following is a specification.

This invention relates to machines for wrapping articles and for applying a suitable binding to the wrapped article to secure the wrapper thereon.

The machine herein disclosed is particularly adapted for wrapping and tying loaves of bread, but it will be readily understood that the machine is capable of wrapping and tying other articles or groups of articles, which are substantially in the form of a rectangular prism.

The objects of the invention are to provide a machine which will be automatic in all its operations, rapid in action and adapted to place the wrappers uniformly so that any printed matter thereon will appear on the desired face or faces of the article.

Other objects are to provide means for passing suitable binders, such as cords, around the article and grouping and securing the ends of the cords together so that the wrapper will be securely held on the article.

Figure 1:
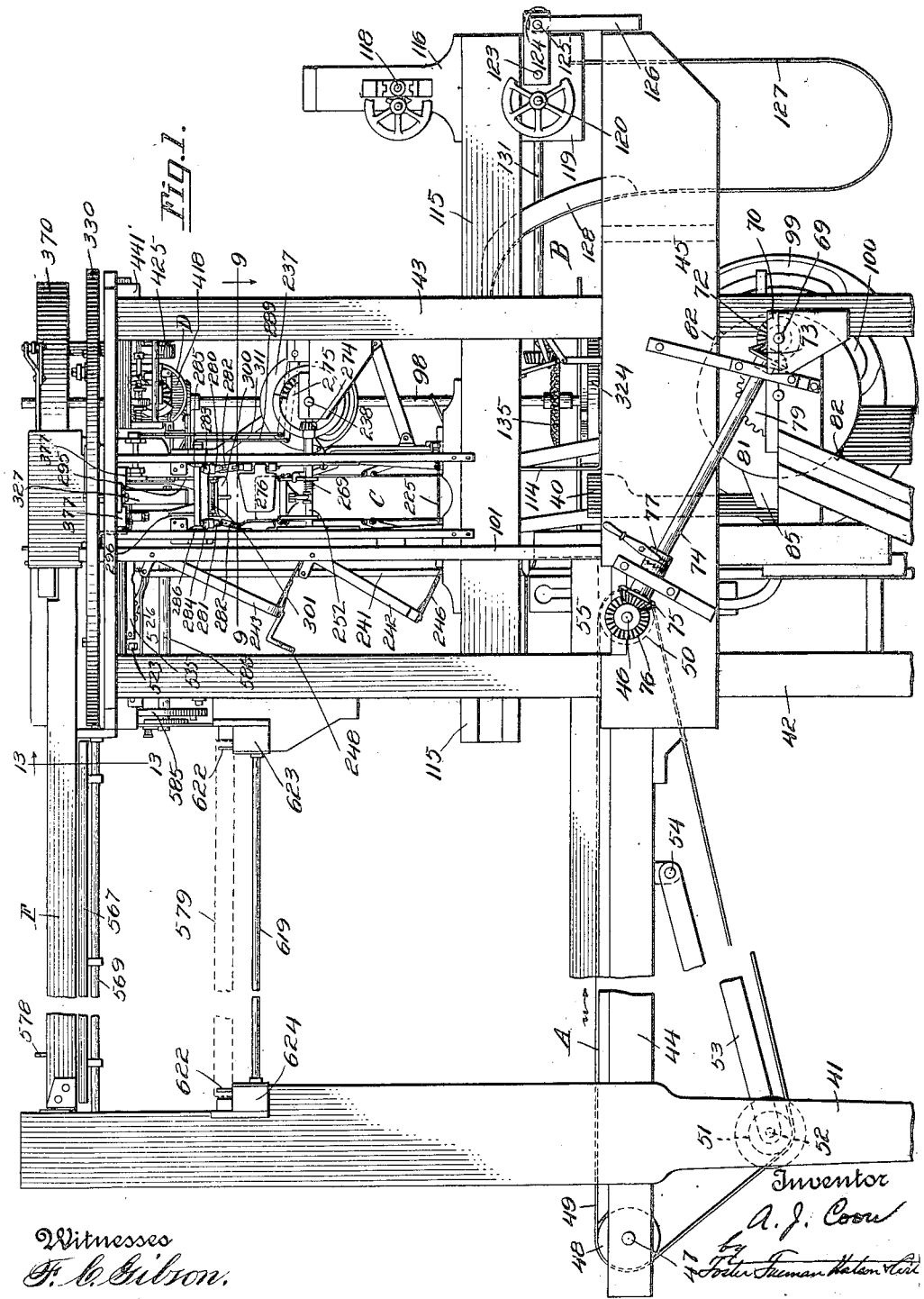
Figure 2:
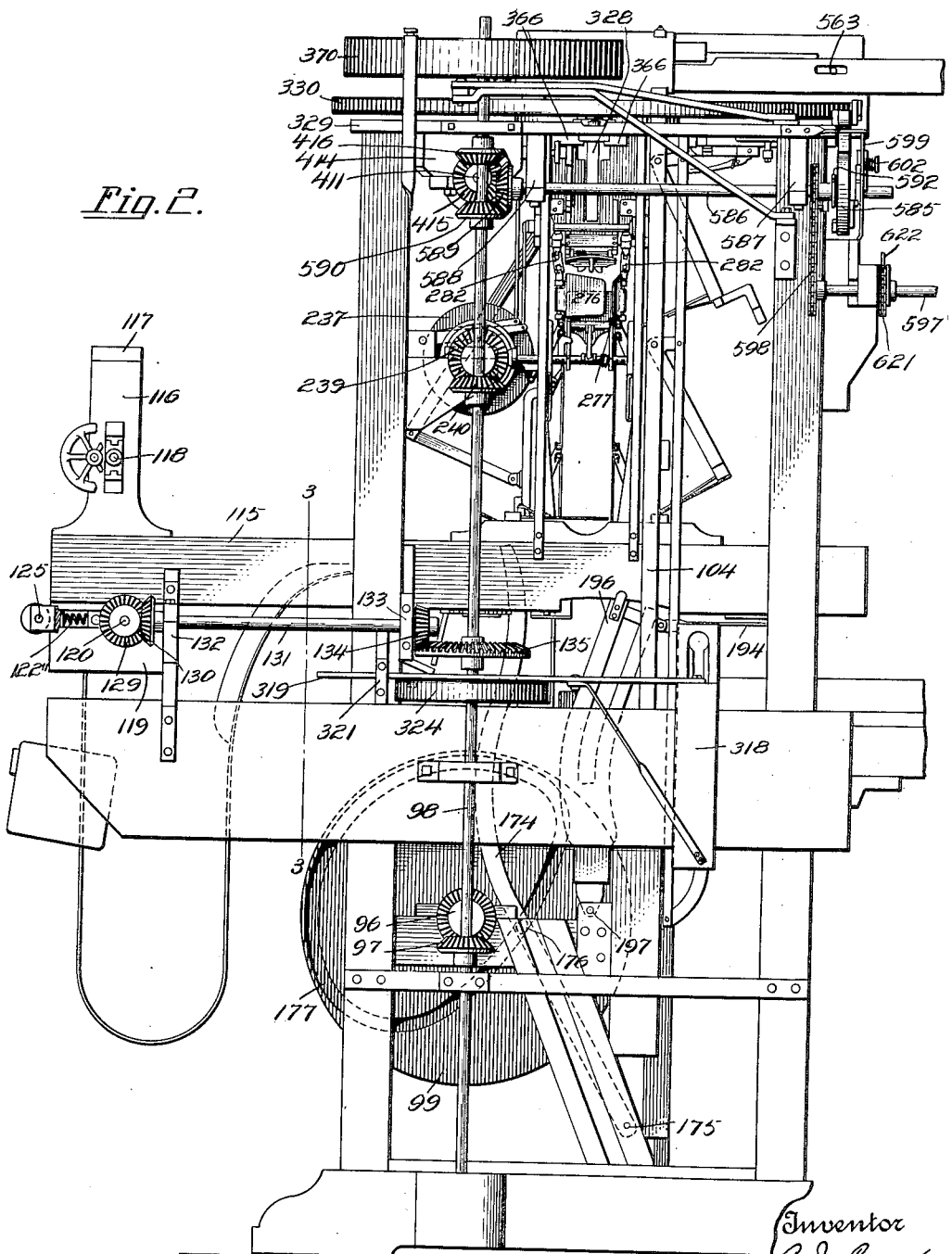
Figure 3:
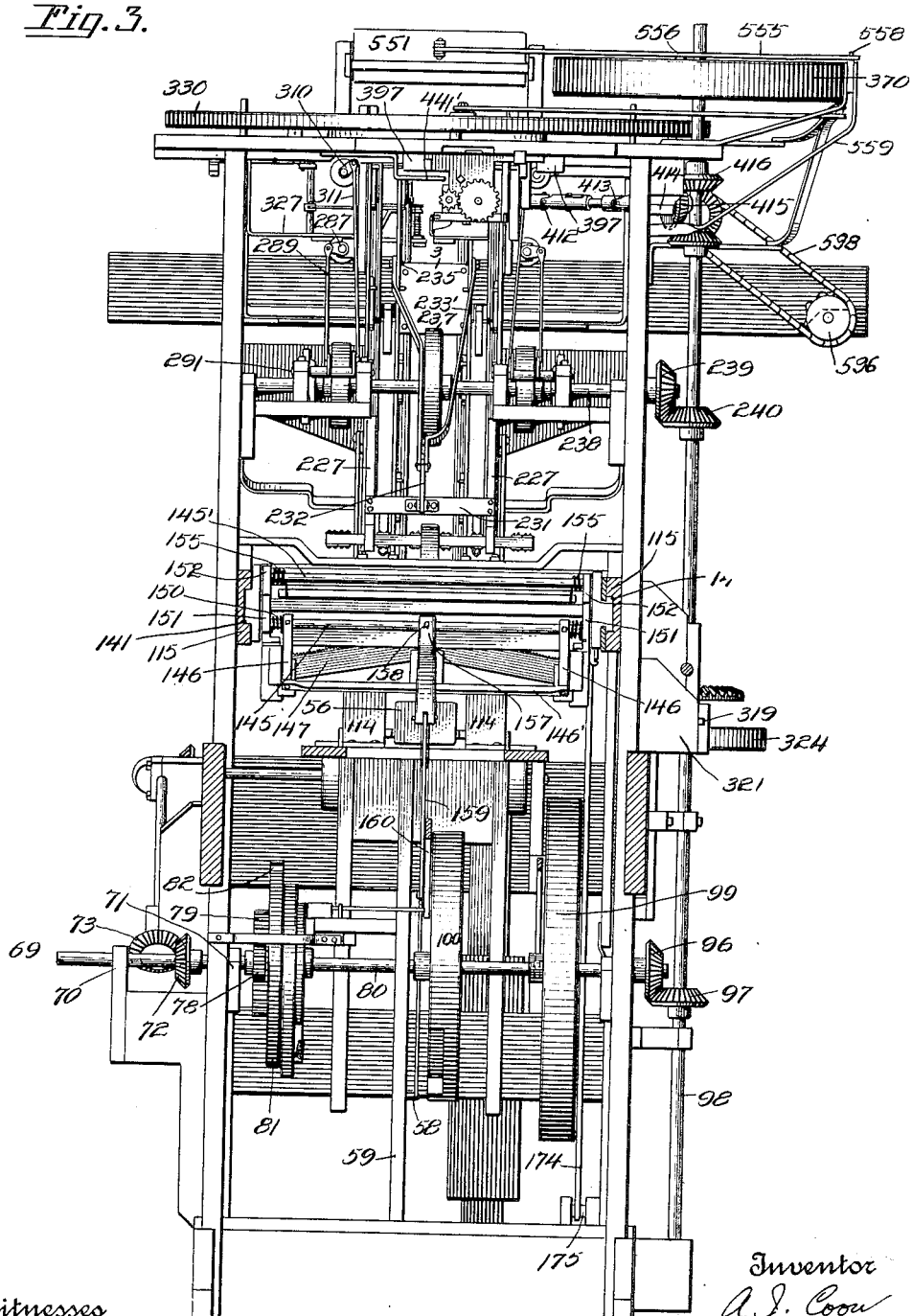
Figure 26:
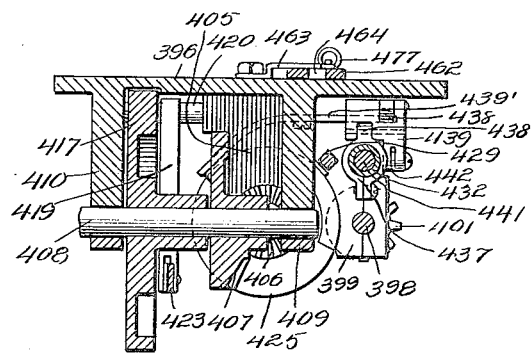
Figure 27:
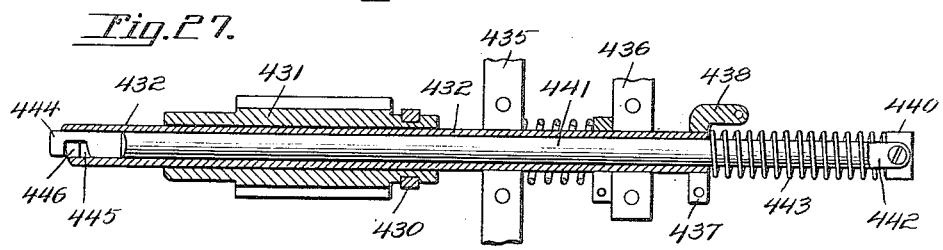
Figure 28:
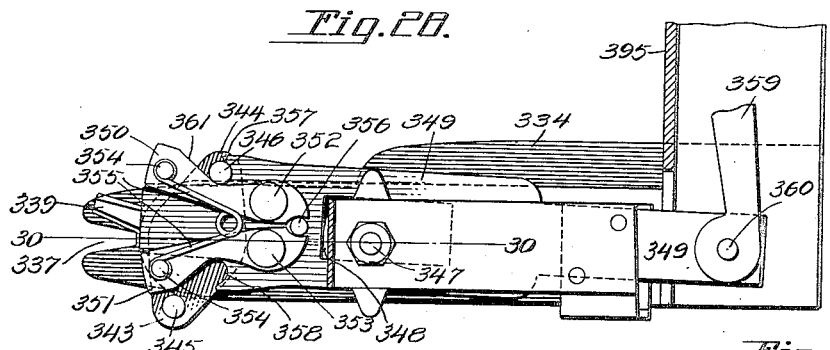
Figures 29, 30:
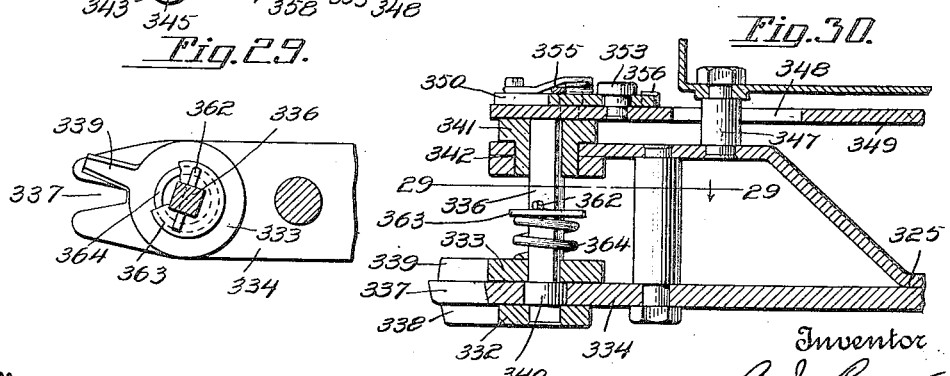

The novel features of the invention will be apparent from the following description, taken in connection with the accompanying drawings, in which, Figure 1 is a side elevation of a machine embodying the invention; Fig. 2 is an elevation of the side opposite to that shown in Fig. 1, certain parts being omitted; Fig. 3 is a longitudinal section on the line 3—3 of Fig. 2; Fig. 4 is a top plan view of the machine; Fig. 5 is a vertical section on the line 5—5 of Fig. 6; Fig. 6 is a transverse section on the line 6—6 of Fig. 5, looking downwardly, and certain parts being broken away to show other parts; Fig. 7 is a vertical section on the line 7—7 of Fig. 8, looking in the direction of the arrow; Fig. 8 is a vertical section on the line 8—8 of Fig. 7, looking in the direction of the arrow; Fig. 9 is a fragmentary section on the line 9—9 of Fig. 1, looking in the direction of the arrow; Fig. 10 is a sectional elevation of the mechanism shown in Fig. 9, the section being taken on the line 10—10 of Fig. 9; Fig. 11 is a sectional elevation on the line 11—11 of Fig. 9; Fig. 12 is a sectional elevation on the line 12—12 of Fig. 9; Fig. 13 is a section on the line 13—13 of Fig. 1, showing a portion of the delivery mechanism; Fig. 14 is an elevation of the upper portion of the left-hand end of Fig. 1; Fig. 15 is a fragmentary vertical section on the line 15—15 of Fig. 14; Fig. 16 is a section on the line 16—16 of Fig. 13, with certain parts broken away; Fig. 17 is a section on the line 17—17 of Fig. 16; Fig. 18 is a section on the line 18—18 of Fig. 16; Fig. 19 is a view similar to Fig. 18, with certain parts omitted and the remaining parts shown in a different operative position from that shown in Fig. 18; Fig. 20 is a plan view of a portion of the paper handling mechanism shown in Fig. 5; Fig. 21 is a perspective view of one of the plates which fold the wrapper around the sides of the article; Fig. 22 is an enlarged vertical section of a portion of the paper handling mechanism, the section being taken on the line 22—22 of Fig. 20; Fig. 22ª is a bottom plan of some of the details shown in Fig. 22; Fig. 22ᵇ is a section on the line b—b of Fig. 22; Fig. 23 is a side elevation of the tying mechanism; Fig. 24 is a bottom plan of the same; Fig. 25 is a top plan of the same; Fig. 25ª is a fragmentary view similar to Fig. 25, with the parts shown in a different position; Fig. 26 is a section on the line 26—26 of Fig. 23; Fig. 27 is a section on the line 27—27 of Fig. 24; Fig. 28 is a top plan of the cord-cutting and holding mechanisms; Fig. 29 is a section on the line 29—29 of Fig. 30; Fig. 30 is a section on the line 30—30 of Fig. 28; Fig. 31 is a side elevation of the mechanism for drawing a loop against the article; Fig. 32 is a bottom plan view of Fig. 31; Fig. 33 is a section on the line 33—33 of Fig. 32; Fig. 34 is a right end elevation of the mechanism shown in Fig. 31; Fig. 35 is a plan view of a detail; Fig. 36 is a fragmentary elevation showing the opposite side of the hook from that shown in Fig. 31; Fig. 37 is a section on the line 37—37 of Fig. 8; Fig. 38 is a section on the line 38—38 of Fig. 8 looking upwardly; Fig. 39 is a perspective view of the starting and stopping mechanism.

The machine comprises generally the article feeding mechanism A, the wrapper feeding mechanism B, the wrapper folding mechanism C, the binding and tying mechanism D and the delivery mechanism E.

Before proceeding to a detailed description of the various mechanisms of which the machine is composed, I will describe in a general way the manner of operation of the various parts of the machine, and for the purpose of clearly defining the various operations I will designate as the front of the article that face which is upward as the article enters the machine on the feeding mechanism A. The lower face, or the face which is opposite the front of the article, will be designated as the rear and the vertical faces which are transverse of the feeding mechanism will be designated as the sides of the article and the vertical faces which are longitudinal of the feeding mechanism will be designated as the ends of the article.

The feeding mechanism A comprises a conveyer which delivers the articles to an elevating member or platen 40, which transfers the articles from the feeding mechanism to the wrapping mechanism C. The wrapper feeding mechanism B is arranged to sever wrappers from a roll and transfer them to a position above the platen 40, so that they will be engaged by the article as it is elevated to the folding mechanism. As the article is moved into the folding mechanism it passes wipers which draw the wrapper downwardly around its sides. The article moves vertically through the folding mechanism which consists of various parts for forming the various folds at the ends of the article, these parts being arranged at intervals along the vertical path, which has flexible sides for guiding the article and also holding the same as it is moved therealong. After the wrapper has been drawn down around the sides of the article, suitable mechanisms coöperate to fold the wrapper on the rear of the article and then to elevate the article to the mechanism which forms the end folds. After the end folds are made the article is moved into engagement with cords which are held across its path and after the article has passed the cord holding means, the latter are brought together at the center of the rear face of the article, the sections of the cord surrounding the article are severed from the supply sections, and the ends seized by a tying mechanism which forms the ends in a loop and slides the loop against the article and draws the same into a hard knot. After the cords or binders have been secured on the article, the latter is continued in its upward movement until engaged by the delivery mechanism. All of these parts coöperate to apply the wrapper to the article and secure the same thereon by means of suitable binders, the various mechanisms operating simultaneously on different articles so that after the operation of each mechanism another article is immediately brought into position to be operated upon.

In order to make the drawings clear, all of the views except those defined as being otherwise, are taken with the parts of the machine in the same relative position.

*Article feeding mechanism.*—The frame of the machine consists of suitable uprights 41, 42 and 43, to which are secured the longitudinally extending members 44 and 45. A driving shaft 46 is mounted in suitable bearings upon the side members 45 and may be driven manually by means of a crank or by any suitable power means. At the outer end of the members 44, a shaft 47 is rotatably mounted. This shaft carries a pulley 48 over which passes the conveyer belt 49. This belt is driven by means of a pulley 50 on the shaft 46. An idler pulley 51 is mounted on a shaft 52, carried by arms 53, which are pivotally mounted at 54 on the members 44. The belt 49 passes over the pulleys 48, 50 and 51, the latter acting as a take-up to provide suitable tension in the belt. The articles are placed on the belt 49 in any suitable manner and at any desired point between the pulleys 48 and 50 and are carried by the belt to the receiving platform 55, from which they are moved by the incoming articles to the top of the platen 40. It should be noted that in the several views in which the platen 40 appears, it is slightly above the platform 55, but it will be understood that during its operation this platen descends to the level of the platform 55 so that the articles may be readily received thereon. As the article moves onto the platen 40 it engages the vertically arranged plate 56 which is secured to the upper end of the lever 57. The lever 57 has its lower end 58 pivoted to an upright 59 which is suitably secured to the frame of the machine. A horizontally arranged link 60 is pivoted to the lever 57 and to the one arm of the bell crank 61, the other arm of which is pivoted at 62 to a support 63, which is secured to the upright 59 and braced from the upright 43 by means of the member 64. A latch 65 is carried in suitable guides 66, secured to the support 63. This latch is pivotally connected at 67 with the bell crank 61 and its function will be hereinafter described. A spring 68 has one end attached to the bell crank 61 and the other end to the guide 66 and tends to draw the bell crank toward the guide 66.

A shaft 69 is mounted in bearings 70 and 71, carried by the frame of the machine. A bevel gear 72 is mounted on the shaft 69 and meshes with a bevel gear 73 on one end of the inclined shaft 74, the other end of this shaft being provided with a bevel gear 75, which meshes with a corresponding gear 76 on the shaft 46. The gear 75 may be loosely mounted on the shaft 74 and arranged to be connected therewith by any suitable form of clutch 77. The shaft 69 carries a pinion 78, which meshes with a gear 79, loosely mounted on the shaft 80, extending transversely of the machine. The gear 78 is rigidly secured to the disk 81, which is also loosely mounted on the shaft 80 and is provided with the projections 82 on its periphery. The shaft 80 is mounted in suitable bearings, carried by the members 83 and 84 arranged on opposite sides of the frame of the machine. A disk 85 is keyed or otherwise secured on the shaft 80 and carries a pawl 86 which, when in operative position, is adapted to be engaged by the projections 82 on the disk 81 so as to cause the disk 85 to rotate with the disk 81. The pawl 86 is mounted on a pivot 87 secured near the periphery of the disk 85 and has secured thereto near its free end a pin 88 which projects through a suitable slot in the disk 85 to the inner side thereof where it engages a cam slot 89 in a bent arm 90, which is mounted on a pivot 91, carried by the disk 85. A spring 92 has one of its ends secured to the disk 85 and its other end secured to the bent arm 90 and tends to turn said arm about the pivot 91 so as to lift the pawl 86 out of engagement with the projection 82 on the disk 81, the cam slot 89 being so formed that the oscillation of the arm 90 causes the pawl 86 to be swung into or out of engagement with the projections 82 on the disk 81. A cam disk 93 is secured on the inner face of the disk 85 and provided with a circumferential recess 94, which is so positioned as to receive the latch 65, the latch being moved into the recess 94 by means of the spring 68.

The object of the mechanism just described is to provide means for automatically starting and stopping the machine. When an article is received on the platen 40 it engages the plate 56 and withdraws the latch 65 from the recess 94 in the cam 93. When the latch 65 is in the recess 94 it is engaged by the arm 90 which is held against the latch by means of the spring 92. Therefore, when the latch is withdrawn the spring 92 will draw the arm around to a position to throw the pawl 86 into the path of the projections 82 on the disk 81 so that as the disk 81 rotates one of these projections 82 will engage the pawl and rotate the disk 85 and the shaft 80 therewith. As the disk 85 begins to rotate the latch 65 will bear against the extension 95 on the arm 90 and when said extension passes the latch the latter will bear against the side of the disk 93 near its circumference and be held in the position shown in Fig. 6. When the recess 94 reaches a position opposite the latch 65, the latter will be drawn into the recess by the spring 68 and as the d'sk 85 continues to rotate the arm 90 will be engaged by the latch and the lower end thereof held stationary so that the arm will be rotated on its pivot 91 and cause the pawl 86 to be lifted out of engagement with the projection 82 on the disk 81. The above described operation takes place provided but a single article is fed into the machine. If, however, a second article is received on the platen, as soon as it reaches its lower position, the second article will engage the plate 56 and prevent the latch 65 from entering the recess 94 so that the disk 85 and the shaft 80 will continue to rotate until there are no articles received on the platen.

The shaft 80 carries a bevel gear 96, which meshes with a corresponding gear 97 on the vertically arranged shaft 98, which actuates portions of the paper feeding mechanism, the folding mechanism, binding and tying mechanism and the delivery mechanism. The shaft 80 also carries the cam wheel 99, which actuates the platen 40 and a portion of the folding and elevating mechanism, and also the cam wheel 100, which actuates the paper cutting mechanism. It will, therefore, be seen that all of the various mechanisms of the machine are simultaneously thrown into and out of operation by means of the latch 65, which is actuated by the articles.

Upright guides 101 and 102 are secured to the frame of the machine and provided with suitable recesses on their inner side in which the rods 103 and 104 are arranged to reciprocate. These rods are connected together near their lower ends by a cross member 105, to which are secured the brackets 106 and 107 on the upper end of which the platen 40 is secured. A bracket 108 is also secured to the cross member 105. This bracket is bifurcated at its upper end and pivotally connected with one end of a lever 109, which is fulcrumed on the pivot 110 secured to the frame of the machine, and has on its other end a suitable adjustable counterweight 111. The lever 109 is arranged alongside of the cam disk 99 and is provided on one side with a suitable roller 112, which engages a cam groove 113 in the side of the cam disk. The groove 113 is suitably formed to oscillate the lever 109 on its pivot 110, and thereby raise and lower the rods 103 and 104 and the mechanism attached thereto.

Suitable stops 114 are arranged on opposite sides of the trip plate 56 and adjacent the platen 40, in order to prevent the articles from moving beyond their proper position on the platen.

*Wrapper feeding mechanism.*—The frame is provided with oppositely arranged longitudinally extending members 115 upon which rest the brackets 116, which are connected together at their top ends by means of a cross member 117 and support a shaft 118, upon which is mounted a roll of the wrapping material, such as paper. The members 115 also support the downwardly extending brackets 119, which carry the shaft 120 having a feed roll 121 thereon. A roll 122 is arranged on the shaft 123, parallel with the roll 121, and carried by a suitable frame which is adapted to move the roll 122 into or out of engagement with the roll 121 by means of the eccentrics 124 on the shaft 125, an operating handle 126 being provided for the purpose of rotating said shaft. The shaft 123 is rotated by means of a gear 123' which meshes with a gear 120' on shaft 120 and the roll 122 is held against roll 121 by means of springs 122''. The wrapping material is passed between the rolls 121 and 122 and downwardly therefrom into the pocket 127 in the form of a loop, the end portion of the strip of wrapping material being guided in the curved trough 128 to the holding and cutting mechanism. In order to provide for a constant feed of the wrapping material, so long as the machine is in operation the shaft 120 is provided on one end thereof with a bevel gear 129 which engages a corresponding gear 130, mounted on the longitudinally extending shaft 131, which is mounted in suitable bearings 132 and 133 carried by the frame of the machine. The shaft 131 is also provided with a bevel gear 134 which meshes with a gear 135 on the vertical shaft 98 so that the wrapping material will be fed to the machine whenever the shaft 98 is rotated.

The end of the wrapping material leads from the trough 128 between the jaws 136 and 137. The jaw 137 is rigidly secured to a frame comprising side members 138 and 139, which are arranged to slide in grooves 140 and 141 respectively, in the members 115. In the normal operation of the machine the side members 138 and 139 are rigidly secured in a fixed position in the grooves 140 and 141 in any suitable manner. The jaw 136 is pivotally mounted on the side members 138 and 139 by means of the pivots 142. The jaws 136 and 137 are provided on their adjoining faces with coöperating fingers 143 and 144, which are adapted to hold the end of the wrapper. The side members 138 and 139 carry the shafts 145 and 145'. The shaft 145 has arms 146 secured thereon, these arms projecting through the lower portion of a cutter 147 and being connected together by means of a cross bar 146'. Arms 148 carrying the cutter-guide and paper clamp 149 are loosely mounted on the shaft 145 and held in definite relation to the arms 146 by means of the springs 150, which are coiled around the shaft 145 and have one end engaging the under side of the arms 148 and the other end engaging the upper side of the arms 146. By referring to Fig. 5, it will be clearly observed how these springs operate to hold the arms 148 in the position shown. The arms 148 are provided with upward extensions 151, which are forked at their upper ends and engage the downwardly extending fingers 152 on the arms 153, which are mounted on shaft 145' and carry the cutter-guide and clamp 154 on their outer ends. This cutter-guide and clamp coöperates with the member 149 to clamp the wrapper while it is being severed from the strip of wrapping material by the cutter 147. Springs 155 are coiled around the shaft 145' and have one of their ends bearing on the upper side of the arms 153 and their other ends bearing against the fixed jaw 136 so that these springs normally tend to move the arms 153 downwardly. The arms 153 have secured thereto near their outer ends the downwardly projecting arms 156, the function of which will be described later. An operating arm 157 is mounted on the shaft 145 and secured thereto by a set screw 158 or in any other suitable manner. The lower end of the arm 157 is pivotally connected with the upright link 159 and the latter has its lower end pivotally connected with the lever 160. The lever 160 has one end mounted on the pivot 161, which is secured to the frame of the machine, and the other end of this lever is provided with a cam roller 162 which is arranged in a cam slot 163 in the side of the cam disk 100. The groove 163 is so formed as to give the proper rocking movement to the shaft 145 to bring the clamping members 149 and 154 together to bind the sheet of wrapping material therebetween at the proper instant and to then raise the cutter 147 between the sides of the clamping members and thereby sever the wrapper from the strip. The clamping members 149 and 154 are preferably provided on their meeting edges with a flexible material such as rubber, so as to securely grip and hold the wrapping material. It will be observed that as the disk 100 rotates the link 159 will be raised and lowered and with it the arm 157. As the arm 157 is raised the shafts 145 and 145' will be rocked and the clamping members 149 and 154 brought together. When these clamping members meet, the shaft 145 will be permitted to continue to move by the spring 150. Owing to the fact that the arms 146, which carry the cutter 147, are rigidly connected with the shaft 145, it will be seen that the cutter will be moved upwardly between the clamping members 149 and 154 after the latter have met and become stationary. The arms 146 are each provided with a small cam 164 and when the cutter 147 has completely severed the wrapper from the strip of wrapping material these cams will come into engagement with the lower ends of the arms 156 and thereby move the clamping members 149 and 154 apart to release the wrapper.

In order to draw the wrapping material across the vertical path of the article, suitable slides 165 and 166 are provided in the grooves 140 and 141. These slides are permanently connected by means of the cross member 167, which forms the lower jaw of a clamp. A shaft 168 is mounted in the slides 165 and 166 and carries the fingers 169 which support the clamping member 170. The clamping member 170 has secured on its lower side the spaced pads 171, these pads being so arranged as to provide spaces for the reception of the fingers 143 and 144. A pin 172 is secured to the slide 165 and the cross member 167 is provided with an opening 173 through which projects the upper end of the curved lever 174, which has its lower end mounted on a pivot 175, secured to a fixed part of the machine. The upper end of the lever 174 is forked to provide a recess for the pin 172 and a cam roller 176 (see Fig. 2) is mounted on the lever intermediate its ends and arranged in the cam slot 177 in the side of the cam wheel 99. The cam slot 177 is so formed that the rotation of the wheel causes the arm 174 to be oscillated and thereby give a reciprocating movement to the slides 165 and 166 and the mechanism mounted thereon. The cross member 167 and the clamping member 170 with its pads 171 constitute jaws which are adapted to grip the wrapping material when said jaws are in their extreme right-hand position (referring to Fig. 5). As soon as the jaws 167 and 170 grip the wrapping material they are moved toward the left to draw the wrapper across the vertical path of the article and when the wrapper has reached the proper position the platen with the article thereon starts to move upwardly and as soon as the article comes into engagement with the wrapper the clamping member 170 is lifted from the cross member 167 to release the wrapper and permit it to be carried along by the article. In order to rock the shaft 168 to effect this gripping and ungripping of the wrapper I have provided a downwardly extending finger 178 thereon (see Fig. 22), this finger extending into a suitably formed slot 179 in a slide 180, carried by the slide 165. The slide 165 is provided with downwardly extending guides 181 and 182, having slots 183 and 184, through which pins 185 extend for the purpose of holding the slide 180 in the guides 181 and 182. The spring 186 is coiled on shaft 168 and has one end secured to the shaft and the other end secured to the cross member 167. This spring is arranged to normally rock the shaft 168 to bring the pads 171 into engagement with the cross member 167. The slide 180 is arranged to engage the end 187 of the member 138 (see Fig. 22) and cause the slide to be moved toward the right, relative to the slide 165 so as to bring the deeper portion 188 of the slot 179 opposite the end of the finger 178. The spring 186 then rocks the shaft 168 and moves the end of the finger 178 into the portion 188 of the slot and thereby clamps the pads 171 against the cross member 167.

From Fig. 5 it will be observed that the wrapping material is severed at a point somewhat beyond the ends of the fingers 143 and 144 and that these fingers will hold the end of the strip of wrapping material so that it will be gripped between the pads 171 and the cross member 167. Immediately after the end of the strip of wrapping material has been gripped, the lever 174 will be moved toward the left (see Fig. 5) and thereby draw the material across the vertical path of the article. When the strip of wrapping material has been drawn out to the desired extent one of the downwardl projecting teeth 189 will be engaged by the tooth 190 on the member 191, which is pivoted at 192 to the plate 191' slidably mounted on the lower edge of the member 115. When the tooth 189 is engaged by the tooth 190 the slide 180 will be drawn toward the left (Fig. 22) and the finger 178 will move up into the shallow portion of the cam slot 179 and thereby rock the shaft 168 and release the wrapper. In order to move the member 191 so that the tooth 190 will engage the tooth 189 on the slide 180 and draw the latter toward the left as above described, the member 191 has pivotally connected therewith at 193 a link 194, the other end of this link being pivotally connected at 195 with the upper end of a slotted lever 196, which is pivoted at 197 to a fixed part of the machine. A bracket 198 is secured to the vertically reciprocating rod 104 so as to move therewith and is provided with a cam roller 199 which engages the slot in the lever 196. By this arrangement, as the platen with the article thereon begins its upward movement the lever 196 will be moved toward the left (Fig. 22) and thereby swing the member 191 on its pivot 192 and move the tooth 190 into engagement with the tooth 189 and draw the plate 191' which is secured to the member 115 by means of bolts 191'' arranged in slots 191''', toward the left.

It will be observed that the cutter 147 is formed so that its middle point first engages the wrapping material and then the opening is made from the middle of the sheet to the edges thereof. The sheet being held between the clamping members 149 and 154 and the cutter 147 passing through the opening between the sides of the clamping members, it will be seen that there is practically no wear on the cutter and very little tendency to dull the same. I prefer to form the cutter with its cutting edge serrated.

*Folding mechanism.*—As the article is moved upwardly by the platen 40 it engages the wipers 200 and 201, arranged on opposite sides of the path of the article. These wipers preferably consist of plates having a central raised portion 203, which is adapted to engage the wrapper and press the same firmly against the middle portion of the article and draw the wrapper toward the ends of the article. In order to provide for irregularities in the size and shape of the articles the plates may be pivotally mounted on links 204, two of these links being provided for each plate. These links may be pivotally connected at their upper ends, as at 205, with suitable uprights 206 and 207, secured to the frame of the machine. In order to force the plates 200 and 201 against the article the links 204 may be provided with laterally extending arms 208, around which coil springs 209 are arranged. The arms 208 may extend through suitable fixed abutments 210, against which one end of the springs 209 press, the other end of these springs bearing against the links 204. It will be readily observed from Fig. 7 that this arrangement tends to normally hold the plates against the article. When the plates 200 and 201 are not in engagement with an article, they are arranged to stand substantially as shown in Fig. 7 and as the article is moved upwardly between them they assume a substantially vertical position in drawing the wrapper around the article. Above the plates 200 and 201 the sides of the article will be engaged by flexible guides which may consist of strips of flexible material 211, such as spring steel, which may be secured at their upper ends to any suitable part of the machine. The lower ends of these strips are preferably bent outwardly and downwardly, as indicated at 212. Arms 213 are mounted on pivots 214, secured in the uprights 206 and 207 and have their upper ends arranged to bear against the strips 211 and at their lower ends, below the pivots 214, are extensions which normally bear against the stop pins 215 on the uprights 206 and 207. Springs 216 are arranged on the pivots 214 and have one end secured to the upper end of the arms 213 and their lower ends bearing against the lower end portions 212 of the strips 211. These springs normally tend to press the strips 211 against the article and at the same time allow the strips to adjust themselves to articles of different sizes and to irregularities in the articles. Instead of using the continuous strips 211 I may use members made up of sections linked together. In Fig. 8 I have shown four guides on one side of the path of the article, the two middle guides being continuous strips and the two outer guides being formed of sections. The latter guides may have an upper section 217, which is secured near the upper end of the machine, an intermediate guide 218, which has its upper end linked to the lower end of the section 217, and a lower section 219, which has its upper end linked to the lower end of the intermediate section 218. The lower end of the section 219 may be bent outwardly, as shown at 220, and provided with a slot 221, through which a guide pin 222, mounted on a member 223, extends. The links 204 are connected with the wipers 200 and 201 by means of a pivot pin 224. The pivot pins 224 extend through the members 223 and the latter have their outer ends extending through suitable openings in the abutments 210. After the article passes the wipers 200 and 201, the portion of the wrapper extending below the article is engaged by fingers 225, which are secured to a bar 226, extending transversely of the machine. The bar 226 is pivotally mounted on arms 227 which have their upper ends pivotally connected with fixed uprights. A bracket 228 is secured to the bar 226 and carries a roller 229, which is arranged to engage the track 230, as the bar 226 is moved transversely of the path of the article. In order to move the fingers 225 across the path of the article to fold the wrapper against the rear face of the article and then remove the fingers from the path of the article to permit the next article to pass therealong, I have provided a cross member 231, connecting the arms 227 and to which one end of the link 232 is pivotally connected, the other end of said link being pivotally connected with the lower end of the lever 233, which carries a cam roller 234 and has its upper end pivoted at 235 to a fixed upright of the machine. The cam roller 234 engages a suitably formed cam groove 236, in the side of a wheel 237, which is mounted on a shaft 238. The shaft 238 is mounted in suitable bearings supported on the frame of the machine and is provided with a bevel gear 239 which engages a corresponding gear 240 on the vertical shaft 98. The lever 233 has an arm 233' bolted thereto and arranged on the opposite side of the wheel 237 and pivoted to a fixed upright at a point in line with the pivot 235. The cam slot 236 is suitably formed to move the fingers 225 transversely of the path of the article and the track 230 is suitably formed to cause the fingers to move in a horizontal plane while they are folding the wrapper against the rear side of the article. A vertical rod 241 is arranged adjacent the rod 104. Bent arms 242 and 243 are pivotally connected at their upper ends with the rods 104 and 241, as clearly illustrated in Fig. 7.

At the lower ends of the bent arms 242 and 243 are cross members 244 and 245, to which are secured the fingers 246 and 247 respectively. The member 244 connects the arms 242 together, but the members 245 extend only a short distance from the bent arms 243, the latter arms being rigidly connected together in order to maintain them in proper relation by means of the connector 248. Each of the arms 245 is provided with a bracket 249, upon which is mounted the finger 247. Brackets 250 are secured on the under side of the members 245 and extend beneath the fingers 247 and support the latter in the position shown in Fig. 7. The rods 103 and 104 and 241 normally reciprocate together, but the rod 241 is arranged to be moved relative to the rods 103 and 104 for the purpose of swinging the bent arms 242 and 243 toward and away from the path of the article. From Fig. 7 it will be seen that if the rod 241 is moved downwardly relative to the rod 104, the fingers 246 and 247 will be moved across the path of the article. As the fingers 246 enter the path of the article they engage the portion of the wrapper extending below the same and fold it against the rear face of the article and over the fold formed by the fingers 225. When the fingers 246 have completed the folding operation the rods 103, 104 and 241 are moved upwardly together, thereby retaining the fingers 246 across the path of the article and elevating the article by means of said fingers. It will be understood that as the fingers 246 are elevated the fingers 225 will be withdrawn so that they will not interfere with the elevating operation.

On opposite sides of the path of the article and arranged parallel with the ends thereof, are shafts 251 and 252, which are mounted in suitable bearings secured to the frame of the machine. These shafts are provided with similarly arranged devices for supporting the article and forming a fold in the wrapper against the end of the article and therefore, a description of one of these supporting and folding mechanisms will be adequate for a complete understanding of both.

A frame comprising arms 253 and 254 is loosely arranged on the shaft 252 and connected therewith by means of a spring 255 which is coiled around the shaft, and has one end secured to a pin 256 on the shaft and the other end attached to the arm 254. This spring normally tends to move the frame in the direction of rotation of the shaft 252. The arms 253 and 254 are connected by a cross member 257, on which is mounted a bracket 258, having a forked end conforming to the exterior of the shaft. An arm 259 is rigidly secured to the shaft and arranged in the fork of the bracket 258 and is adapted to be engaged by the bracket to limit the movement of the frame on the shaft, due to the action of the spring 255. A bar 260 is pivotally mounted on the free ends of the arms 253 and 254 and carries a platen 261. As shown in Fig. 8, this platen comprises an upwardly projecting portion 262 and a portion 263 projecting into the path of the article. An arm 264 is secured to the bar 260 and pivotally connected with one end of a link 265, which has its other end pivotally connected with the arm 259. The arm 254 is provided with a notch 266 in its lower side (see Fig. 8) and a notch 267 in its upper side. The notch 266 is adapted to be engaged by a latch 268, which is adapted to prevent the arm from swinging downwardly from the position shown in Fig. 8. The notch 267 is adapted to be engaged by the latch 269, which has a horizontally extending portion 270 (see Fig. 11), the end of which engages a cam 271, mounted on the shaft 238. The horizontal portion 270 of the latch is mounted in suitable guides, supported by the frame of the machine, and is provided with a pin 272 on one side thereof, which is engaged by one end of a spring 273, which has its other end fixed, this spring being arranged to press the end of the horizontal portion 270 of the latch against the cam 271.

The shaft 252 is provided with a pinion 274, which is arranged to be intermittently actuated by the mutilated gear 275. The gear 275 is adapted to give one complete revolution to the pinion 274 in the shaft 252 for each revolution of the shaft 238. The shaft 252 is held stationary when the teeth of gear 275 are out of engagement with the teeth of pinion, by means of the shoe 252' which slides on the cam surface 275'. It will thus be seen that the platen 261 will be intermittently rotated about the shaft 252. As the shaft 238 rotates the latch 269 will be moved by the cam 238, the latter being so arranged that the latch 269 will be disengaged from the arm 254 when the pinion 274 is engaged by the teeth on the gear 275 to rotate the shaft 252. When the latch 269 releases the arm 254 the frame carrying the platen 261 is rotated through a certain angular distance on the shaft 252 by means of the spring 255, this angular motion being limited by the engagement of the arm 259 with the bracket 258. When the article, which is being elevated by the fingers 246, reaches approximately the elevation of the horizontal portion 263 of the platen 261, as shown in Fig. 8, the article will be engaged by the portion 263 of the platen and supported thereby. It should be noted that when the frame carrying the platen 261 is rotated on the shaft 252 by the spring 255, the bar 260 and the platen 261 will be rocked, owing to the arrangement of arms 259 and 264 and the link 265. The platen engages the article as above described at about the same instant that the arm 254 engages the latch 269 which has, during the rotation of the shaft 252, been moved by the cam 271. When the latch 269 engages the arm 254, the frame carrying the platen 261 will be stopped and the shaft 252 will continue to rotate, thereby bringing the vertical portion 262 of the platen against the end of the article and fold the portion of the wrapper extending along the rear of the article against the end thereof. When the shaft 252 completes its rotation the wings 276 and 277, which are mounted on vertical shafts 278 and 279 respectively, are swung in succession against the upright portion 262 of the platen 261, thereby folding the portions of the wrapper which extend along the sides of the article around the ends thereof. In order to move the wings 276 and 277 in proper relation to the operation of the other parts of the machine, I have provided shafts 280 and 281, which are connected with the shafts 278 and 279 respectively by means of universal joint couplings 282. The shafts 280 and 281 are mounted in suitable bearings and are provided on their upper ends with gears 283 and 284, which engage the gears 285 and 286 respectively on the shaft 287. The shaft 287 is mounted in suitable fixed bearings and provided on one end with an arm 288, which is pivotally connected with the upper end of the link 289, the lower end of the latter being pivotally connected with one end of the lever 290. The other end of the lever 290 is mounted on a fixed pivot 291 and at an intermediate point on said lever is arranged a cam roller 292 which engages a cam groove 293 in the side of a wheel 294, carried by the shaft 238. The groove 293 is so formed as to cause the shaft 287 to be rocked to give the proper movement to the wings 276 and 277. The gears 283, 284, 285 and 286 are preferably of the mutilated type to provide a definite and rapid movement for the wings. Above the wings just described are arranged vertical slides 295, which are mounted in a suitable guide 297 and connected together by a cross member 298 and a shaft 299. The shaft 299 is arranged on the lower ends of the slides 295 and has pivotally mounted thereon the wiper 300. A spring 301 is arranged on the shaft 299 and normally tends to swing the upper end of the wiper into the path of the article. The wiper 300 is provided on its inner face or that face which is toward the article, with a wedge-shaped member 302, which is adapted to form a crease in the article as it moves past the wiper. While the end folds are being made in the wrapper, as above described, the arms 242 and 243, carrying respectively the fingers 246 and 247, are swung out of the path of the article and then lowered to the position shown in Fig. 7. These arms are then swung into the path of the article as heretofore described, the fingers 246 folding a wrapper against the rear face of the succeeding article and the fingers 247 engaging the rear face of the first article. The rods 103, 104 and 241 are then moved upwardly, thereby elevating both articles simultaneously. As the article is moved upwardly from the mechanism which makes the end folds, the wiper 300 draws the portion of the wrapper extending along the front of the article over the end thereof against the previously formed folds. As the article is passing the wiper 300 the latter is swung to a vertical position and a crease is formed in the end of the article. In order to form similar creases in the sides of the article as it is moved upwardly, plates 303 are secured at the sides of the path of the article on the guides 211. These plates are provided with wedge-shaped members 304 for forming the creases in the article.

In making the final end fold in the wrapper, as above described, by means of the wiper 300, it is necessary to have the wiper engage the article before the other end folds are released by the wings 276 and 277 and in order to accomplish this the wiper is held in a position immediately above the wings until the wings have been swung against the article. The wiper is then lowered into engagement with the article and the latter elevated and the wings swung outwardly. The wiper is held out of engagement with the article until the wings 276 and 277 have been swung inwardly in order to avoid the possibility of depressing the extended front portion of the wrapper so that it would be caught by the wing and improperly folded. The elevation and depression of the slides 295 and 296 which carry wiper 300 is accomplished by providing a shaft 305, which is provided with a member 306 carrying a pin 307 to which is connected the upper end of the rod 308, the lower end of this rod being pivotally connected with a bracket 309, secured to the slide 295. The shaft 305 is also provided with an arm 310, to which is pivotally connected the upper end of the rod 311, the lower end of this rod being pivotally connected with one end of the lever 312, the other end of which is mounted on the pivot 291. A cam roller 313 is mounted on the side of the lever 312 and engages a cam groove 314 in the wheel 294. The groove 314 is suitably formed to raise and lower the slides 295 and 296 at the proper intervals.

For the purpose of moving the rod 241 relative to the rod 104 in order to swing the fingers 246 and 247 into and out of the path of the article a bent lever 315 has its shorter arm pivotally connected with the rods 104 and 241 and has its longer upright arm provided with a cam roller 316 which engages a suitable cam groove 317 in the member 318. The member 318 is carried by the member 45 of the frame of the machine and adapted to slide back and forth thereon. For the purpose of sliding the member 318 a lever 319 is provided which is connected directly with the top of the member 318 and has an arm 320 which is connected with the lower end thereof. The lever 319 extends through a fixed guide 321 and carries a cam roller 322 which engages a cam slot 323 in the disk 324 carried by the upright shaft 98. It will be seen by reference to Fig. 6 that as the disk 324 rotates in the direction of the arrow the lever 319 and the member 318 will be moved back and forth.

*Binding and tying mechanism.*—Above the wrapper folding mechanism are arranged movable frames which hold two right-angularly arranged cords across the path of the article so that the article will engage the cords in its upward movement. These frames are indicated generally by the numerals 325, 326, 327 and 328. The frames 326, 327 and 328 are carried in suitable guides arranged on the under side of a platform 329 at the top of the machine, and the frame 325 is carried by the tying mechanism to be hereinafter described. These frames are moved into and out of the path of the article by means of cam rollers engaging suitable grooves in a cam disk 330 arranged above the platform 329 and rotatably mounted on the latter by means of antifriction rollers 331. The frame 325 carries cord-holding and cutting devices 332 and 333 respectively. Referring to Figs. 28, 29 and 30 it will be seen that these devices are arranged on opposite sides of a bar 334 carried by the frame 325 and are mounted on a vertical shaft 336. The bar 334 has a recess 337 in its outer end which is adapted to receive the cord. The member 332 is provided with a projection 338 which has its side edges somewhat rounded. It will be seen that when the cord is held in the recess 337 and the shaft 336 is moved so as to carry the projection 338 across the recess 337, the cord will be gripped and held between the projection and the lower side of the bar 334. The cutter 333 is provided with a projection 339 which has its side edges sharpened so that it coöperates with the edges of the recess 337 to form shears. As the projection 339 is swung across the recess it will be seen that the cord will be severed. The shaft 336 is preferably made angular and provided with a cylindrical portion 340, which has a bearing in the bar 334. The upper end of the shaft 336 passes through a shouldered sleeve 341 which has a bearing in the member 342 of the frame 325, the shoulder of said sleeve resting on the upper side of the member 342. The sleeve 341 is provided with laterally projecting ears 343 and 344 carrying respectively the upright pins 345 and 346. A pin 347 is secured in the frame 325 and extends through the slot 348 in the plate 349. At the outer end of the plate 349 are mounted the members 350 and 351 on the pivots 352 and 353 respectively. These members 350 and 351 are provided on their free ends with upwardly projecting pins 354 which are engaged by the spring 355, this spring being arranged to normally press the free ends of the members 350 and 351 apart. The plate 349 also carries an upwardly projecting pin 356 which is arranged rearwardly of the pivots 352 and 353 and adapted to be engaged by the members 350 and 351 to limit the extent to which they are pressed apart by the spring 355. The plate 349 is formed with the shoulders 357 and 358 at its opposite sides which are adapted to respectively engage the pins 344 and 345. A lever 359 is pivotally connected at 360 with the plate 349 and is adapted to reciprocate the latter.

The operation of the cord-holding and cutting mechanism is as follows: Referring to Fig. 28 it will be seen that by moving the plate 349 outwardly the shaft 336 will be moved by the engagement of shoulder 357 with pin 346 so as to carry the cord holder 338 and cutter 339 across the recess 337. When the cord holder 338 and cutter 339 have been moved to the opposite side of the recess 337 the plate 349 is moved in the reverse direction and as it moves the engagement of the pin 346 with the inclined surface 361 of the member 350 will cause the outer end of said plate to be moved downwardly so that the pin 345 will be in line with the shoulder 358 in the plate 349 and be engaged by the plate when it is moved outwardly again. It will be seen that the next outward movement of the plate 349 will cause the cutter 339 to be moved across the recess 337 to the position shown in Fig. 28. The projection 338 on the holding device moves simultaneously with the projection 339, and it will therefore be seen that by the reciprocation of the plate 349 the cord may be simultaneously gripped and cut. A pin 362 is arranged transversely of the shaft 336 and forms an abutment for the plate 363 which is arranged on the shaft. A spring 364 is arranged between the plate 363 and the cutter for the purpose of pressing the latter against the bar 334.

The frame 327, as will be seen from Fig. 8, carries a cord-holding and cutting mechanism similar to that just described. The frame 328 is arranged on the opposite side of the vertical path of the article from the frame 327 and carries a needle 365 having an eye in its outer end through which the cord loosely passes. From the needle the cord passes across the path of the article and the end is held by the cord-holding device carried by the frame 327. The frame 328 is mounted in suitable guides 366 and carries an upwardly projecting pivot, on which is arranged the arm 367 which carries the cam roller 368, this cam roller engaging the cam slot 369 in the cam wheel 330. From Fig. 4 it will be observed that the shape of the cam slot 369 is such that the frame 328 will be reciprocated by oscillating the cam wheel 330. For the purpose of oscillating the cam wheel 330 a cam wheel 370 is mounted on the upper end of the shaft 98 and provided on its under side with a cam groove which is engaged by a cam roller 371 carried by the lever 372. The lever 372 has one end pivoted at 373 to a bracket 374 carried by the platform 329. The free end of the lever 372 is pivotally connected with one end of a link 375 which has its other end pivotally connected at 376 with the cam wheel 330. The cam groove on the under side of the wheel 370 is suitably formed to swing the lever 372 back and forth, and thereby oscillate the wheel 330 by means of the link 375.

The frame 327 is mounted in suitable guides 377 and carries a vertical shaft 378. The shaft 378 is provided with an arm 379, and a link 380, which is pivotally connected with the arm 379 and also the plate 349 of the cord-cutting and holding mechanism carried by the frame, is adapted to actuate the cord-cutting and holding mechanism in the manner hereinbefore described by rocking the shaft 378. For the purpose of actuating the shaft 378 an arm 381 is carried by the shaft and adapted to be engaged by a member 382 carried by the lever 383. The lever 383 is pivotally connected with one of the guides 377 at 384 and a spring 385 is arranged to move the lever 383 and the arm 382 away from the arm 381. A spring 386 is coiled around the shaft 378 and has one of its ends secured to the frame 327 and its other end secured to the arm 381 and is adapted to move the arm 381 toward the member 382 and thereby move the shaft 379 in one direction. The member 382 is provided with an upward projection 387 which is adapted to be engaged by an arm 388 carried by the cam wheel 330 and projecting downwardly through a slot 389 formed in the platform 329 (see Fig. 37). The frame 327 is provided with an upwardly projecting pin 327' which passes through the platform 329 and engages a suitable slot 327'' in the cam wheel 330. The frame 327 will be reciprocated by means of the pin 327' and the cam slot 327'', and the slot is so formed that the arms 387 and 388 will be in alinement at the instant when it is necessary to rock the shaft 378 in order to actuate the cord-cutting and holding mechanism.

The operation of the mechanism just described is as follows: When the wheel 330 is moved in one direction the arm 388 will engage the arm 387 on the member 382 and move the latter into engagement with the arm 381 on the shaft 379. Further movement of the wheel 330 will cause the shaft 379 to be rocked in one direction and thereby move the plate 349 of the cord-holding and cutting mechanism forwardly. When the wheel 330 moves in the opposite direction the spring 386 will restore the parts to their original position and draw the plate 349 rearwardly.

The frame 326 carries a needle 390 which has an eye 390' in its outer end. The needle 390 is arranged in a horizontal plane slightly above the needle 365, and a cord which passes loosely through the eye of the needle 390 is arranged at right angles to the cord carried by the needle 365 and has its end held by the cord-holding device carried by the frame 325. The frame 326 is mounted in suitable guides 391 on the under side of the platform 329 and is provided with an upwardly projecting pin 392 which extends through a slot 393 in the platform 329 and engages a cam slot 394 in the cam wheel 330. The cam slot 394 is suitably formed to reciprocate the frame 326 as the cam wheel 330 is oscillated.

The frame 325 is secured to a bracket 395 carried by the frame 396 of the tying mechanism. The frame 396 is carried by suitable guides 397 on the under side of the platform 329. A shaft 398 is mounted in bearings 399 and 400 carried by the frame 396. This shaft has secured on one end thereof a pinion 401 which meshes with a gear 402 carried by a shaft 403 mounted in bearings 404 and 405. The shaft 403 carries a pinion 406 which is adapted to be intermittently rotated by means of the mutilated gear 407 carried by a shaft 408 arranged at right angles to the shaft 403. The shaft 408 is mounted in bearings 409 and 410 and is connected at its outer end with a shaft 411 by means of the universal joint couplings 412 and 413. The shaft 411 is mounted in a bearing 414 carried by the platform 329 and is provided with a bevel gear 415 which meshes with a corresponding gear 416 on the shaft 98. It will therefore be seen that the shaft 408 will be rotated whenever the shaft 98 is rotated and the shaft 403 will be intermittently rotated by means of the gears 406 and 407.

The shaft 408 carries a cam wheel 417 having a cam groove 418 in one of its sides which is engaged by a cam roller carried by the lever 419. The lever 419 has its upper end secured to a pivot 420 carried by the bracket 421 and 422. The lower end of the lever 419 is pivotally connected with one end of a link 423, the other end of this link being pivotally connected with the lever 359 mounted on a pivot 424 and pivotally connected with the plate 349 of the cord-cutting and holding mechanism, as hereinbefore described.

The shaft 403 carries a cam wheel 425 having a cam groove 426 in its outer surface and a cam surface 427 on one end. A cam roller 428 is arranged in the groove 426 and mounted on a sliding rod 429. The rod 429 is mounted in suitable guides carried by the frame 396 and has on its inner end a yoke 430 which engages a groove in the hub of a gear 431 slidably mounted on the tube 432. A spring 433 is coiled around the rod 429 and bears against the yoke 430 and the bracket 395 and is adapted to move the rod 429 and the gear 431 inwardly. The shaft 398 carries on its inner end a pinion 434 which meshes with the gear 431, the gear 431 having a relatively wide face so that it will always remain in engagement with the pinion 434. The tube 432 is mounted in brackets 435 and 436. The rearward end of the tube 432 carries a collar 437 having an extension 438 on which is pivotally mounted a lever 439. The lower end of the lever 439 is connected with the collar 440 on the rod 441 by means of a link 442. The upper end of the lever 439 is pivotally connected with one end of a link 439' which has its other end pivotally connected with a lever 439''. The lever 439'' is mounted on a pivot 439''' and has on its free end a roller 439'''' which engages the cam surface 427 of the cam wheel 425. The cam surface 427 has an abrupt portion 427' which permits the rod 441 to be suddenly drawn rearwardly in the tubular member 432. A spring 443 is arranged between the collar 440 and the collar 437 and is adapted to move the rod 441 rearwardly. The rod 441 extends through the tube 432 and has its inward end flattened as indicated at 444 and provided with a notch 445. The inward end of the tube 432 is provided with a plug 446 having a suitable opening therein for the flattened end 444 of the rod 441.

One member 447 of a pair of grippers is secured on the inward extension 448 of the hub of the gear 431 and carries a pivot 449 on which is mounted a coöperating member 450. A spring 451 is coiled around the pivot 449 and has one end in engagement with a pin 452 on the member 450 and its other end bearing against the hub extension 448. The spring 451 is adapted to move the member 450 to the closed position shown in Fig. 25. The member 450 is provided with a rearward extension 453 which carries a laterally projecting pin 454 which is adapted to engage the cam 455 as the gear 431 rotates and move the member 450 to the open position shown in Fig. 25ª. The cam 455 is carried on a bracket 456 which has its rearward end secured to the frame 396. The gripper members 447 and 450 are provided with notches 457 for a purpose to be hereinafter described and the member 447 carries a laterally projecting pin 458 which is arranged in the notch 457 in the member 450 when the grippers are in the closed position shown in Fig. 25.

The inward end of the tube 432 has a notch 459 which provides a surface adapted to coöperate with the end 444 of the rod 441 to act as a gripper for the cords. The inward end of the tube 432 is also provided with a circumferential surface groove 460, and a longitudinally extending groove 461.

On the upper side of the frame 396 is arranged a flat bar 462 which is adapted to slide in a suitable guide 463. The bar 462 is provided with a longitudinal slot 464 through which projects a bolt 465 secured to the frame 396 and adapted to guide the forward end of the bar. A cross piece 466 is secured to the forward end of the bar 462 and carries a member 467 having a slot 468 which engages a pin 469 on the bracket 456 and has its inward end provided with a tapering recess 470. The member 462 has a recess 471 in one side forming an abutment 472 for the end of a dog 473 which is mounted on a pivot 474 secured to the platform 329. The dog 473 is pivotally connected with a sliding member 475 carried in suitable guides on the under side of the platform 329 and having one end connected with a spring 476 which is attached to the platform. A spring 477 has one end secured to the frame 396 and has its other end connected with the member 462 by means of a pin 478. The spring 476 normally tends to draw the member 475 inwardly and the spring 477 tends to draw the member 462 outwardly. The member 475 has a downward extension 479 at its outer end which is adapted to be engaged by the frame 396 as the latter moves outwardly. In order to reciprocate the frame 396 a pin 480 (see Fig. 7) is secured to the upper side thereof and extends through an opening 481 in the platform 329 and carries on its upper end a roller 482 which engages a cam slot 483 in the cam wheel 330. The cam slot 483 is so arranged in the wheel 330 as to give the proper movement to the frame 396 as the cam wheel is oscillated.

The frame 326 which is arranged on the opposite side of the path of the article from the frame 396 is provided with an inwardly extending member 484 which has a V-shaped recess 485 in its inner end. From Fig. 7 it will be seen that as the frames 326 and 396 move inwardly the member 484 passes beneath the member 467. The frames 327 and 328 carry respectively the members 486 and 487 which have recesses, similar to the recesses 485, in their inward ends. As will be seen from Fig. 8 the members 486 and 487 are arranged in the same horizontal plane slightly above the member 467 and are adapted when at the limit of their inward movement to stand slightly separated for a purpose to be described hereinafter.

The frame 325 carries an inwardly projecting member 488 having a V-shaped recess in its inward end and the frame 326 carries a similarly formed coöperating member 489.

The frame 326 carries a transversely extending shaft 490 which is mounted in bearings 491 and 492. An arm 493 is mounted on the shaft 490 by means of a pin 494 and is adapted to have universal movement relative to the shaft. A spring 495 is coiled around the shaft 490 and has one end arranged to engage the lower side of the arm 493, as indicated at 496, the other end 497 of the spring bearing against the under side of the frame 326. As thus arranged the spring 495 normally tends to swing the arm 493 upwardly. The arm 493 projects through a cam slot 498 in the upright member 499 of the frame 326 and has on its inward end a pivot 500 which carries a member 501 having an upwardly extending hook 502 and a downward extension 503. For the purpose of swinging the member 501 on the pivot 500 I have provided a member 504 which is arranged on one side of the arm 493 and secured thereto by means of a screw 505 which is arranged in a slot 506 in said member. The member 504 is connected with the extension 503 on the member 501 by means of a pivot 506'. The member 504 is provided at its top with a laterally projecting portion 507, the rear edge of which engages a cam 508 on the face of the upright member 499 of the frame 326. The face of the cam 508 is in the form of an arc of a circle having the shaft 490 as its center so that as the arm 493 moves upwardly the member 501 will be retained in the position shown in Fig. 31. A spring 509 is coiled around the pivot 500 and has one end secured to a pin 510 on the arm 493 and its other end bearing against a pin or screw 511 on the member 501. As thus arranged the spring 509 tends to swing the member 501 upwardly and at the same time permits this member to be moved downwardly under the influence of a sufficient pull on the hook 502.

A latch member 512 is mounted on a pivot 513 on the face of the member 499 and pressed toward the slot 498 by a spring 512' and extends upwardly and is provided at its upper end with a cam 514. A recess 515 in the side of the member 512 is adapted to receive the arm 493 and hold the latter against upward movement. From Fig. 34 it will be observed that the cam slot 498 in which the arm 493 moves has its upper and lower ends substantially vertical and its intermediate portion arranged on an incline.

The purpose of this construction is to permit the hook 502 to be in line with the groove 461 in the tubular member 432 of the tying mechanism when the arm 493 is in its lowest position, and to cause the hook to move to a central position in line with the guides 484 and 489 for the cords when in its uppermost position. The arm 493 is moved upwardly by means of the spring 495, and in order to move the arm downwardly in opposition to said spring I have provided a cam 516 on a member 517 which is adapted to slide in suitable guides 518 carried by the frame 326. The member 517 is also provided with a downwardly projecting pin 519 which is engaged by one arm of the lever 520. The lever 520 is arranged on a pivot 521 carried by the frame 326 and has an arm 522 which is adapted to engage stops 523 and 524 as the frame 326 is reciprocated. The stops 523 and 524 are carried by the platform 329, and from Fig. 32 it will be seen that as the frame 326 moves inwardly the arm 522 will engage the stop 524 and thereby move the cam 516 inwardly on the frame 326. The cam 516 is in the form of an inclined plane which is adapted to engage a suitably formed projection 525 on the arm 493. When the cam 516 has been moved forwardly it will be seen that the arm 493 will be free to move upwardly when it is released by the latch 512. When the frame 326 moves rearwardly the arm 522 will engage the stop 523 and move the cam 516 rearwardly on the frame 326 and the engagement of the cam 516 with the projection 525 on the arm 493 will cause the latter to be moved downwardly and engaged by the latch 512.

For the purpose of positively holding the arm 493 in its uppermost position as the frame 326 moves outwardly or rearwardly I have provided a plate 526 which is hinged at 527 to the platform 329 and extends inwardly and is provided at its inner end with an opening 528, through which passes a bolt 529 secured on the under side of the platform 329. The lower side of the plate 526 engages the head of the bolt, and a spring 530 is arranged between the plate and the platform 329 and presses the plate downwardly against the head of the bolt. The plate 526 has an offset at 531 and a lateral extension 532 which is arranged to be engaged by a roller 533 mounted on a pin 534 carried by the arm 493. The roller 533 engages the upper side of the projection 532 as the frame 326 is moved rearwardly and thereby positively holds the arm from being drawn downwardly. When the roller 533 has moved to a position in the rear of the projection 532 the arm 522 will engage the stop 523 and move the arm 493 downwardly as above described, and after the arm 493 has been moved downwardly the roller 533 will engage the under side of the projection 532 as it moves inwardly and thereby elevate the plate 526 and compress the spring 530.

A lever 535 is pivoted at 536 on the frame 326 and extends inwardly to the inner face of the cam 508, the inner face 537 of said lever being adapted to be engaged by the lateral extension 507 on the member 504 and prevent the hook 502 from being drawn downwardly. The inner end of the lever 535 is held against lateral movement by means of a screw 538 which is carried by the frame 326 and engages a suitable slot 539 in the lever. A spring 540 is coiled on a screw 541 carried by the lever 535 and has one of its ends 542 secured in an opening in said lever and has its other end secured to a pin 543 carried by the frame 326. The spring 540 is arranged to swing the lever 535 upwardly. The upper edge of the lever 535 is inclined at 544 to form a cam surface which is adapted to engage the inner end 545 of one of the guides 391 and move the lever 535 downwardly as the frame 326 is moved rearwardly. When the lever 535 moves downwardly the lateral extenson 507 on the member 504 will be permitted to move over the top edge of the lever and thereby permit the hook 502 to be drawn downwardly.

Immediately above the members 467, 484, 486 and 487 carried respectively by the frames 396, 326, 327 and 328 are plates 546 which are hinged to suitable brackets 547 carried by the platform 529 and pressed downwardly by suitable springs 547'. These plates are each provided with a central V-shaped recess on their inner edge immediately above the corresponding recesses in the members 467, 484, 486 and 487. Wedge-shaped members 548 are arranged on the sides of the path of the article above the plates 546 and in line with the creasing members 302 and 304.

The operation of the binding and tying mechanism is as follows: As the article is moved upward from the wrapper folding mechanism the frames 325, 326, 327 and 328 are in their outward or rearward position and two right angularly arranged cords which cross at the center of the path of the article are held across the path by means of the cord holders carried by the frames 325, and 327 and the needles 365 and 390. The article in its upward movement engages the cords and as the frames are held stationary the cords will be drawn through the eyes of the needle and around the front and vertical faces of the article. When the article reaches a position immediately above the plane of the plates 546 as shown in Fig. 7, the elevating mechanism is stopped and the frames 326, 327, 328 and 396 are moved inwardly by means of the cam wheel 330. As the frames move inwardly the members 467, 484, 486 and 487 move the plates 546, whch during the upward movement of the article hang downwardly in vertical planes, to the horizontal position shown in Figs. 7 and 8, the purpose of the plates 546 being to hold the wrapper against the article and prevent the members 467, 484, 486 and 487 from mutilating the wrapper. As the frames move inwardly the ends of the cords will be held in the recesses in the members 467, 484, 486 and 487 and thereby brought together at the center of the rear or lower face of the article. The members 486 and 487 are moved inwardly ahead of the members 467 and 484, but the former members which are in substantially the same horizontal plane, as will be observed from Fig. 8, stand a slight distance apart when at their innermost position so that there is a small space between the ends of these members which permits the ends of the cords held in the recesses in the members 467 and 484 to be brought to a position immediately beneath the center of the article. As the members 467 and 474 are moved to the overlapping position shown in Fig. 7 they coöperate to form a small opening beneath the center of the article through which all of the ends of the cords pass. From Fig. 7 it will be seen that the tubular member 432, on which the ends of the cords are looped, is arranged between the members 467, 484 and the members 488 and 489, the latter members coöperating to form a small central opening directly below the opening formed between the members 467 and 484. From Figs. 7 and 8 it will also be observed that the needles 365 and 390 hold the supply ends of the cords in the recesses 337 of the holding and cutting mechanisms. As soon as the frames 327 and 328 reach their innermost position the shaft 336 of the cord-holding and cutting mechanism is moved and the portion of the cord which surrounds the article is severed from the supply section and the supply end of the cord is simultaneously gripped by the cord-holding mechanism in the manner hereinbefore described. In a similar manner the portion of the cord surrounding the article and held by the cord-holding mechanism carried by the frame 325 is severed from the supply section and the supply end is simultaneously gripped. The article is at this instant in the operations surrounded by two cords which have their ends grouped together and held by means of the members 467, 484, 488 and 489. While the frame 396 is moving inwardly the blank portion of the mutilated gear 407 of the tying mechanism is opposite the pinion 406 and the rotation of the latter is interrupted. As the frame 396 moves inwardly the grippers 447 and 450 stand in open position at the side of the tubular member 432, the space between the grippers being in line with the recesses in the members 467 and 484. As the pinion 406 is not at this instant being rotated by the gear 407 the gear 431 will be stationary and as the frame 396 continues to the end of its inward movement it will be seen that the ends of the cords will enter the space between the grippers. When the frame 396 reaches its innermost position the teeth on the gear 407 engage the teeth on the pinion 406 and the latter is rotated.

From Figs. 23 and 25ª it will be seen that when the gripper is arranged at the side of the tubular member 432, as above described, the pin 454 is in engagement with the lower end of the cam 455 so that as soon as the pinion 406 begins to rotate the pin 454 moves off the end of the cam 455 and the gripper 450 is closed, thereby confining the cords in the recesses 457 in the grippers. As the pinion 406 continues to rotate the grippers will be carried around the tubular member 432 and the ends of the cords laid in the circumferential groove 460, the pin 458 throwing the free ends of the cord rearwardly so that they will not be bound in the loop and interfere with the forming of the knot. When the grippers reach a point substantially on the opposite side of the tubular member 432 the cam roller 428 enters the rearwardly inclined portion of the groove 426 in the wheel 425, and thereby causes the rod 429 and the gear 431 and the gripper to be moved rearwardly. This rearward movement continues until the roller 428 enters the straight portion of the groove 426 shown in Fig. 24. The roller 428 reaches the straight portion of the groove 426 at about the instant that the grippers are directly above the tubular member 432. Further rotation of the pinion 406 carries the grippers around to a point where they have made a complete revolution about the tubular member 432. At this instant the roller 428 enters the forwardly inclined portion of the groove 426 and the gear 431 with the grippers is quickly moved to its extreme inner position, owing to the steepness of the forwardly inclined portion of the groove 426. As the grippers continue to revolve around the tubular member 432 and move inwardly the ends of the cord will cross over the portion laid in the circumferential groove 460 and will be laid in the notch 459 at the end of the tubular member and between the latter and the hook 444. At this instant the cam roller 439'''' will stand at the edge of the abrupt portion 427' of the cam surface 427, whereby a slight additional rotation of the pinion 406 will cause the roller 439'''' to move rearwardly along the surface 427', thereby permitting the spring 443 to quickly draw the rod 441 rearwardly and grip the ends of the cord between the end of the tubular member 432 and the hook 444. Just before the hook 444 grips the ends of the cord the grippers 447 and 450 strike the side of the cam 514 carried by the latch member 512 and move the latter outwardly and release the arm 493. The arm 493 is then raised by means of the spring 495 until the hook 502 engages the longitudinal groove 461 in the tubular member 432 rearwardly of the cord which has been passed around the tubular member. As the gear 431 continues to rotate and when the grippers 447 and 450 are directly above the tubular member the pin 454 again engages the cam 455 and opens the grippers and thereby releases the ends of the cords. The ends are, however, held by means of the hook 444. At about this instant in the operations the cam wheel 330 is moved and the frames 326, 327, 328 and 396 are moved outwardly. As the frame 396 moves outwardly the bar 462 which carries the member 467 will be prevented from moving outwardly by the engagement of the dog 473 with the abutment 472 in the side of the bar, the spring 477 being at the same time extended. Just before the frame 396 reaches the end of its outward movement the rear edge of the frame engages the downward extension 479 on the member 475 and draws the latter rearwardly so that the dog 473 will be disengaged from the abutment 472. The spring 477 will then quickly draw the bar 462 and the member 467 rearwardly until the cross member strikes the buffer 549 arranged between the inner edge of the frame 396 and the cross piece 466. As the frames 396 and 326 separate the hook 502 will be drawn off the end of the tubular member 432 and carry along with it the portions of the cords which were wrapped around the tubular member, in the form of a loop. As soon as the hook 502 is disengaged from the tubular member 432 it quickly moves upwardly to a point immediately below the article, the top of the hook being substantially on a level with the plates 546. As the arm 493 moves upwardly the hook 502 slides the loop upwardly along the free ends of the cords and to a point adjacent the rear face of the article. The rearward movement of the frame 396 draws the loop into a tight knot, owing to the fact that the ends of the cords are gripped by the hook 444. The guide member 467, as above described, remains at its innermost position during the greater portion of the outward movement of the frame 396 for the purpose of holding the cords at the center of the rear face of the article and also to position the knot at this point. At about the instant that the loop is drawn into a knot the outer end of the rod 441 strikes a bracket 441' carried on the under side of the platform 329 and thereby causes the rod 441 to be held stationary while the tubular member 432 continues its rearward movement, thereby releasing the ends of the cord. When the lever 535 has been moved downwardly the member 501 carrying the hook 502 will be permitted to swing downwardly and become disengaged from the knot. As the frame 326 approaches the limit of its outward movement the arm 522 will strike the stop 523 and swing the arm 493 to its lower position as hereinbefore described. This completes the operation of placing the binders around the article and severing portions of suitable length from the supply sections of the binders and for tying the ends of the binders together. It will be observed that as the needles 365 and 390 and the cord-holding devices separate the cords will be drawn through the eyes of the needle and positioned across the path to be engaged by the article following. A leaf spring 550 carried by the frame 328 coöperates with the pin 458 carried by the cord grippers, to hold the free ends of the cord back as they are carried around the tubular member 432, and thereby prevent these ends from being caught by the end 444 of rod 441. From the drawings it will be seen that the cords or binders are placed in the creases which are formed by the wedge-shaped members 302 and 304 and that these creases are maintained in the article while the binders are being tied thereon by means of the wedge-shaped members 548. By this arrangement the binders are securely held on the article because the binders are not only placed in the creases, but the article expands after it leaves the machine and takes up any slackness which may exist in the binders. When the frames 396, 326, 327 and 328 move outwardly the plates 546 swing downwardly out of the path of the article and hang in a vertical position while the succeeding article is being moved to a position to have the binders tied therearound. As the succeeding article is moved upwardly by the elevating mechanism its front or upper face engages the lower or rear face of the article above and forces the latter upwardly and out of engagement with the vertical guides.

*The delivery mechanism.*—When the article with the binders tied thereon has been moved to a position above the vertical guides it is engaged by a pusher 551 carried by a frame 552 which slides in the horizontal guides 553. The frame 552 is moved back and forth across the vertical path of the article by means of a link 554 which has one end pivotally connected with the frame and its other end pivotally connected with a lever 555. The lever 555 carries a cam roller 556 which engages a suitably formed cam groove 557 in the upper surface of the cam wheel 370 and has one end mounted on a fixed pivot 558 carried on a bracket 559 secured to the frame of the machine. The pusher 551 moves the articles into a trough 560 which has at one side a plate 561 hinged at 562 to the side of the trough and provided with an outwardly extending guide rod 563 and a spring 564 for the purpose of causing the articles to be moved against the side wall 565 of the trough. A portion of the trough is provided with the downwardly swinging doors 566 and 567 which are carried by the shafts 568 and 569 respectively. The shafts 568 and 569 are mounted in suitable bearings carried by the frame of the machine and are provided at their outer ends with the coöperating gear segments 570 and 571. A frame 572 is pivoted at 573 and 574 to the uprights 41 and carries a stop 575 which is adapted to engage the lower edge of the gear segment 571, and thereby holds the doors 566 and 567 in the closed or horizontal position. A block 576 is pivotally mounted at the upper end of the frame 572 and carries a rod 577 which extends over the door 566 and is provided with a trip plate 578. When the trough 560 has received a certain number of articles the next article delivered by the pusher will cause the article which is adjacent the trip plate 578 to move the latter outwardly and thereby swing on its pivots 573 and 574 and disengage the stop 575 from the gear segments 570 and 571, thereby permitting the doors 566 to swing downwardly and deliver the articles thereon to a tray 579 carried by the frame of the machine or any other suitable receiving means.

In order to swing the doors 566 and 567 back to their horizontal position after having discharged the article I have mounted on the end of the shaft 568 a pinion 580 which is engaged by the sector gear 581 mounted on a pivot 582. The sector gear 581 has a rearwardly extending arm 583 which carries a roller 584. The roller 584 engages the periphery of the cam wheel 585 mounted on a shaft 586. The shaft 586 is mounted in bearings 587 and 588 and carries a bevel gear 589 which meshes with a corresponding gear 590 on the vertical shaft 98 so that the shaft 586 will be rotated with the shaft 98. A sleeve 591 is loosely mounted on the shaft 586 near the wheel 585 and is provided with a flange 592 having a tooth or projection 593 on its periphery. A sprocket wheel 594 is secured to a flange 595 on the sleeve 591 and is adapted to drive a sprocket wheel 596 carried by the shaft 597, by means of the chain 598. An upright plate 599 is fixed on the frame of the machine and provided with an opening 600. On one side of the plate 599 is secured a plate 601 by means of a pivot 602 and a guide 603. A spring 604 is adapted to swing the plate 601 upwardly to the position shown in Fig. 13. On the inner side of the plate 601 are cams 605, 606 and 607 and when the plate is moved to its upward position by the spring 604 the cam 605 engages the upper edge of the opening 600 in the plate 599. The plate 599 carries a circular cam 608 which is adapted to coöperate with the cams 605, 606 and 607 in a manner to be hereinafter described. The wheel 585 has a pivot 609 extending transversely therethrough and carrying on one end an arm 610 having a roller 611 on its outer end adapted to engage the cams 605, 606, 607 and 608. A spring 612 is arranged on the pivot 609 and tends to swing the arm 610 inwardly. On the opposite side of the wheel 585 from the arm 610 the pivot 609 carries a finger 613 which ordinarily moves around with the wheel 585, but when the arm 610 is swung inwardly this finger engages the projection 593 on the flange 592 and causes the sleeve 591 to rotate with the wheel 585. When the arm 583 is swung downwardly by the doors 566 and 567 a block 614 carried on the side of the arm 583 strikes the top of the cam 605 and swings the plate 601 on which the cams 605, 606 and 607 are mounted downwardly to the position shown in Fig. 19. The cam 605 will be engaged by the roller 611 carried by the arm 610 as said arm is rotated with the wheel 585 and be guided to the inner surface of the circular cam 608 and be carried around on the interior of this cam. This causes the finger 613 to engage the projection 593 as above described, and thereby rotate the sleeve 591 with the shaft 586. The flange 595 on the sleeve 591 carries a pin 615 which is adapted to be engaged by the dog 616 to prevent backward rotation of the sleeve 591. As the sleeve 591 rotates the pin will strike the upper edge of the dog 616 and depress the latter until the pin passes off the end of the dog when the latter will be swung upwardly against the sleeve by means of a suitable spring 617. The sprocket wheel 594 carried by the flange 595 on the sleeve 591 rotates the sprocket wheel 596 by means of the chain 598. The shaft 597 is rotated by the sprocket 596 and carries suitable sprocket wheels 617 and 618. A shaft 619 is arranged parallel with the shaft 597 and mounted in suitable bearings on the frame of the machine and carries sprockets 620 in alinement with the sprockets 617 and 618. Suitable conveyer chains 621 are arranged on the sprockets 617, 618 and 620 and carry members 622 which are adapted to engage the tray 579 after it has received the articles and move the latter to a position at the front ends of the guides 623 and 624, on which the tray is adapted to slide. From the drawings it will be seen that the chains 621 have their upper sides arranged in the guides 623 and 624 and just below the upper surface of the guides with the members 622 arranged to engage the trays. The guides 623 and 624 extend rearwardly o. the trough 560 a sufficient distance to permit an extra tray to be placed on the guides 623 and 624 in the rear of the tray which is in position to receive the articles from the trough, and therefore as the tray which has received the articles is moved to the forward ends of the guides 623 and 624 the extra tray, above mentioned, will be moved to a position to receive the articles from the trough. In this way the machine automatically delivers the articles onto the trays and after a tray has been filled it is moved out of the way and a new tray placed in position so that it is only necessary for the operator to remove the loaded trays and to place the empty trays in position on the rear portion of the guides 623 and 624. When the latch 575 is released the doors 566 and 567 will be held in their closed position by the engagement of the cam roller 584 with the periphery of the cam wheel 585 and the doors will not be permitted to swing downwardly until the cam wheel 584 rides over the abrupt portion 585' of the wheel 585. From Figs. 13 and 17 it will be observed that when the cam roller 584 passes over the abrupt portion 585' of the cam wheel 585 it will drop into the recess 585", the depth of this recess being sufficient to permit the doors 566 and 567 to swing throughout the desired range of movement. As the cam wheel 585 continues to rotate it will be seen that the cam roller 584 will again be carried onto the high portion of the wheel and thereby swing the doors 566 and 567 to their closed or horizontal position as shown in Fig. 13. When the doors are again swung to their closed position the frame 572 will be drawn inwardly by means of the spring 625, and the latch 575 will engage the lower edges of the sector gears 570 and 571 and prevent the doors from swinging downwardly again when the cam roller 584 rides off the abrupt portion 585' of the cam wheel 585. As the arm 583 is moved upwardly by the cam wheel 585 the spring 604 will swing the plate 601 upwardly to the position shown in Fig. 18 so that when the roller 611 has about completed a full revolution on the interior of the cam 608 it will strike the cam 607 and be moved thereby to the exterior of the cam 608, as clearly shown in Fig. 18. This latter causes the arm 610 to be swung outwardly and the finger 613 to be disengaged from the projection 593, thereby stopping the rotation of the sleeve 591. This occurs at about the instant that the pin 615 moves over the end of the dog 616 so that the sleeve will be prevented from rotating backwardly by the engagement of the pin with the dog.

From the above description it will be seen that this machine is adapted to automatically feed the articles to be wrapped and to sever wrappers from a roll of the wrapping material and deliver them to a position to be applied to the article, to hold the wrapper on the article, to pass suitable binders around the article and tie the ends of the same and to deliver the articles from the machine after being wrapped and tied, it only being necessary for the operative to supply the articles to be wrapped to the feeding mechanism and to remove the loaded trays from the delivery mechanism and supply empty trays thereto.

The machine is rapid in its operations, owing to the fact that several articles are simultaneously operated upon in the various steps of applying the wrapper to the article and tying the wrapper thereon. Owing to the fact that the binders are placed in creases formed in the article and the loop formed in the ends of the binders is drawn up against the article, the binders are tightly drawn around the article and the wrapper is securely held thereon.

In accordance with the provisions of the patent statutes I have described the principles of my invention and disclosed mechanisms for carrying these principles into practice, but I desire to have it understood that my invention is not limited to the details shown and described, or to the particular arrangement of the various mechanisms and I therefore claim as my invention all such mechanisms as come within the scope of the appended claims.

What I claim as new and desire to secure by Letters-Patent is,

1. In a machine of the class described, the combination of means for moving the articles along a substantially straight path, means for holding a wrapper across said path to be engaged by the articles moving therealong, independent yieldably mounted plates having a central raised portion, and arranged to normally project into the path for drawing the wrapper around three faces of the article, and additional means for folding the wrapper against the remaining faces of the article.

2. In a machine of the class described, the combination of means for moving the articles along a substantially straight path, means for holding a wrapper across said path to be engaged by the articles moving therealong, independent pivotally mounted laterally yieldable plates having central raised portions and arranged on opposite sides of said path and normally projecting into the path, for drawing the wrapper around three faces of the article, and additional means for folding the wrapper against the remaining faces of the article.

3. In a wrapping machine, an article supporting and moving platen, a plurality of cam actuated reciprocating rods having an operative connection with said platen, and a folding and article supporting and moving mechanism pivotally supported by said rods.

4. In a wrapping machine, a pivotally supported frame adapted to impart upward movement to the article to be wrapped, means for moving said frame vertically, means for rocking said frame on its supporting pivots at the end of its upward movement and means for supporting the article after said frame has been withdrawn therefrom.

5. In a wrapping machine, the combination of means for moving the article to be wrapped, and a plurality of spring pressed pivotally supported wipers arranged in the path of travel of the article, said wipers consisting of rectangular plates formed with a central raised portion.

6. In a wrapping machine, means for elevating the article to be wrapped, said means including a pivotally supported member adapted to carry the article while being elevated, and means for swinging said member transversely of the path of travel of the article at the ends of the vertical movements of the member.

7. In a wrapping machine, means for elevating the article to be wrapped, fold forming means arranged in the path of travel of the article, said folding means continuing said elevation, a second folding means, active after said second elevation, a pivotally supported elevating member having an operative connection with the first elevating means, said member continuing the elevation of the article after the operation of said second folding means.

8. In a wrapping machine, folding mechanism comprising an intermittently rotatable shaft, an arm rigidly secured thereto, a frame yieldably mounted on said shaft, a fold-forming platen pivotally mounted in said frame, and a link connecting said arm and said platen.

9. In a wrapping machine, folding mechanism comprising an intermittently rotatable shaft, an arm rigidly secured thereto, a frame yieldably mounted on said shaft, a fold-forming platen pivotally mounted in said frame, a link connecting said arm and said platen, and a latch device adapted to stop the rotation of said frame.

10. In a wrapping machine, folding mechanism comprising an intermittently rotatable shaft, an arm rigidly secured thereto, a frame mounted on said shaft, a spring operatively connecting the frame with the shaft, a fold-forming platen pivotally mounted in said frame, a link connecting said arm and said platen, a latch device adapted to limit the forward rotation of said frame, and means for preventing backward rotation of said frame.

11. In a wrapping machine, intermittently operated elevating mechanism, folding mechanism, and a plurality of resilient members arranged longitudinally of the path of travel of the article to be wrapped for supporting the latter during the intervals between the steps of its elevation.

12. In a wrapping machine, guides forming a substantially straight path, fold-forming mechanism arranged along said path, a pair of relatively movable members arranged to reciprocate longitudinally of said path, a combined fold-former and carrier operatively connected with said members, and means for moving said members relatively to each other to move said carrier into and out of said path.

13. In a wrapping machine, guides forming a substantially straight path, fold-forming mechanism arranged along said path, a pair of relatively movable members arranged to reciprocate longitudinally of said path, a plurality of carriers operatively connected with said members, and adapted to successively engage the articles and carry them along said path and means for moving said members relatively to each other to move said carriers into and out of said path.

14. In a wrapping machine, guides forming a substantially straight path, fold-forming mechanism arranged along said path, a plurality of rods arranged to reciprocate longitudinally of said path and also longitudinally relatively to each other, and a plurality of article carriers pivotally connected with said rods, and adapted to successively engage the articles and carry them along said path and adapted to be moved into and out of said path by the relative reciprocation of said rods.

15. In an apparatus of the class described, means for applying a wrapper to an article, means for securing the wrapper thereon and means adapted to deliver the articles from said wrapper securing means and comprising a trough, a downwardly swinging door forming the bottom of said trough, means for latching said door in closed position, means for releasing said latching means when a predetermined number of articles are received on said door, and means for automatically closing said door after the articles have been discharged therefrom.

16. In an apparatus of the class described, article-feeding mechanism adapted to move the articles in a horizontal path, means for moving the article in a vertical path, means for applying a wrapper to an article and securing the wrapper thereon while the article is traversing said vertical path, a horizontally movable member at the top of said vertical path adapted to move the articles to a position at one side of said path, a trough arranged to receive the articles from said vertical path, said trough having a downwardly swinging door forming the bottom thereof, a latch device for holding said door in closed position, means for automatically unlatching the door when a predetermined number of articles have been received thereon, and means for automatically closing said door after the articles have been discharged thereby.

17. In an apparatus of the class described, means for moving an article in a vertical path, means for applying a wrapper to an article and for securing the wrapper thereon while the article is traversing said path, and means for delivering the article from said path and comprising a horizontally arranged trough at the top of said path, means for transferring the articles from said path to said trough, a receiving device arranged below said trough, a downwardly swinging door forming the bottom of said trough above said receiving device, means for holding said door in closed position, means for releasing said holding means when a predetermined number of articles have been received on said door whereby the articles are discharged on to said receiving device, and means for automatically closing said door and moving another receiving device into position.

18. In an apparatus of the class described, means for moving an article upwardly along a vertical path, means for applying a wrapper to an article and securing the wrapper thereon while traversing the said vertical path, a horizontally arranged trough at the top of said path and provided with a plurality of oppositely arranged downwardly swinging doors forming the bottom thereof, means for transferring the articles from said vertical path to said trough, means for holding said doors in closed position, means for releasing said doors when a predetermined number of articles have been received thereon whereby the articles are discharged by said doors and means for automatically restoring said doors to the closed position.

In testimony whereof I affix my signature in presence of two witnesses.

ARTHUR J. COON.

Witnesses:
B. M. KENT,
ARTHUR L. BRYANT.